(12) United States Patent  
Miyokawa et al.

(10) Patent No.: US 6,734,517 B2
(45) Date of Patent: May 11, 2004

(54) SEMICONDUCTOR LASER DIODE MODULE

(75) Inventors: Jun Miyokawa, Tokyo (JP); Yuichiro Irie, Tokyo (JP); Etsuji Katayama, Tokyo (JP); Kaoru Sekiguchi, Tokyo (JP); Kiyokazu Tateno, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 09/867,449

(22) Filed: May 31, 2001

(65) Prior Publication Data

US 2002/0009107 A1 Jan. 24, 2002

(30) Foreign Application Priority Data

May 31, 2000  (JP) .......................... 2000-162097
Mar. 9, 2001  (JP) ........................... 2001-67198

(51) Int. Cl.[7] ............................... H01L 31/0232
(52) U.S. Cl. ..................... 257/436; 257/434; 257/431; 257/184; 257/108
(58) Field of Search .................... 257/21, 82, 108, 257/113, 184, 431, 434, 436

(56) References Cited

U.S. PATENT DOCUMENTS

| | | | | |
|---|---|---|---|---|
| 5,570,444 A | * | 10/1996 | Janssen et al. ............... | 385/90 |
| 5,619,609 A | | 4/1997 | Pan et al. | |
| 5,924,290 A | * | 7/1999 | Yoshino ...................... | 62/3.7 |
| 6,094,515 A | * | 7/2000 | Miki et al. .................. | 385/31 |

FOREIGN PATENT DOCUMENTS

| | | |
|---|---|---|
| DE | 34 31 738 | 3/1986 |
| DE | 36 30 795 | 3/1988 |
| EP | 0 484 167 | 5/1992 |
| EP | 0 858 106 | 8/1998 |
| EP | 0 860 917 | 8/1998 |
| EP | 0 872 747 | 10/1998 |
| FR | 2 702 054 | 9/1994 |
| GB | 2 296 100 | 6/1996 |
| JP | 01-296204 | 11/1989 |
| JP | 01-306804 | 12/1989 |
| JP | 05-150146 | 6/1993 |

OTHER PUBLICATIONS

U.S. patent application Ser. No. 09/867,449, filed May 31,2001, pending.
U.S. patent application Ser. No. 09/867,402, filed May 31, 2001, pending.
U.S. patent application Ser. No. 09/867,401, filed May 31, 2001, pending.
U.S. patent application Ser. No. 09/867,549, filed May 31, 2001, pending.

(List continued on next page.)

*Primary Examiner*—Wael Fahmy
*Assistant Examiner*—Wai-Sing Louie
(74) *Attorney, Agent, or Firm*—Oblon, Spivak, McClelland, Maier & Neustadt, PC

(57) ABSTRACT

A semiconductor laser diode module in which a laser diode and an optical fiber are optically coupled with each other efficiently irrespective of an ambient temperature change within the laser diode module. The laser diode module includes a laser diode, an optical system including an optical fiber and a lens portion, a base configured to support the laser diode and at least a portion of the optical system, and a bottom plate configured to support the laser diode, the optical system, and the base. The optical system is configured to receive and transmit a beam emitted from the laser diode through the lens portion to the optical fiber along an optical axis. The base includes a structural support member configured to prevent warping of the base, where the structural support member extends along the base in a direction generally parallel to the optical axis.

57 Claims, 21 Drawing Sheets

OTHER PUBLICATIONS

U.S. patent application Ser. No. 09/867,449, Miyokawa et al., filed May 31, 2001.

U.S. patent application Ser. No. 10/622,703, Miyokawa et al., filed Jul. 21, 2003.

U.S. patent application Ser. No. 09/867,449, filed May 31, 2001, pending.

U.S. patent application Ser. No. 09/875,035, filed Jun. 7, 2001, pending.

* cited by examiner

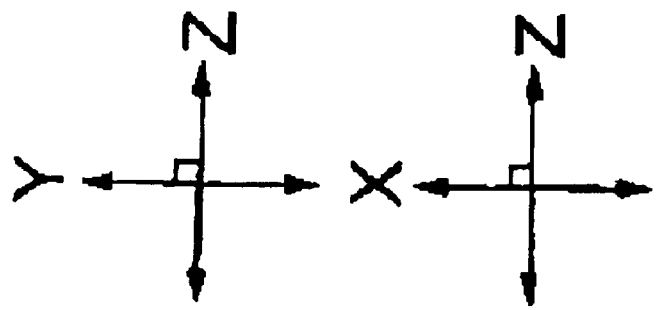
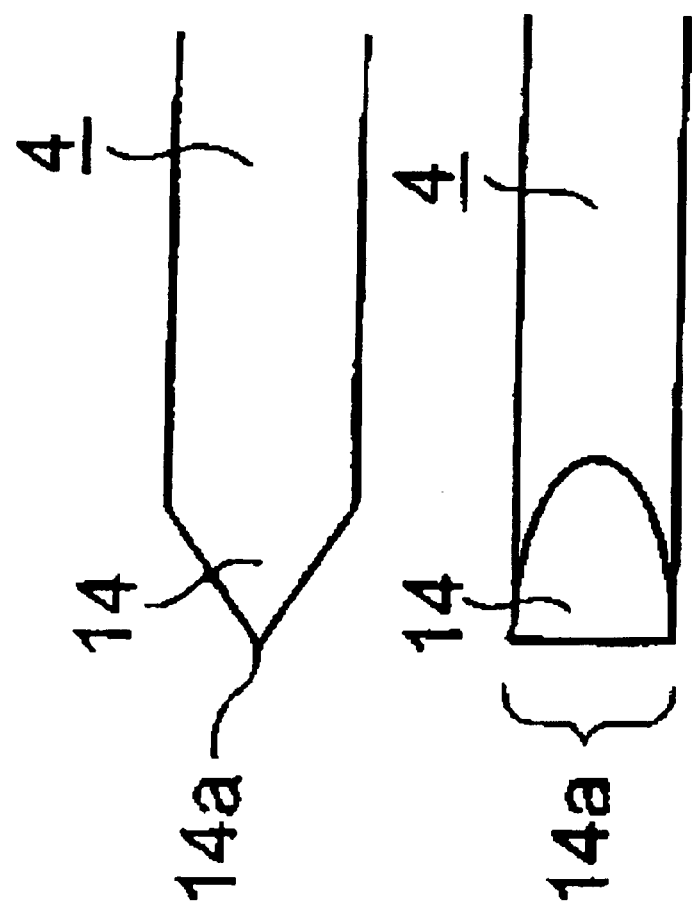
FIG. 7(a)
FIG. 7(b)

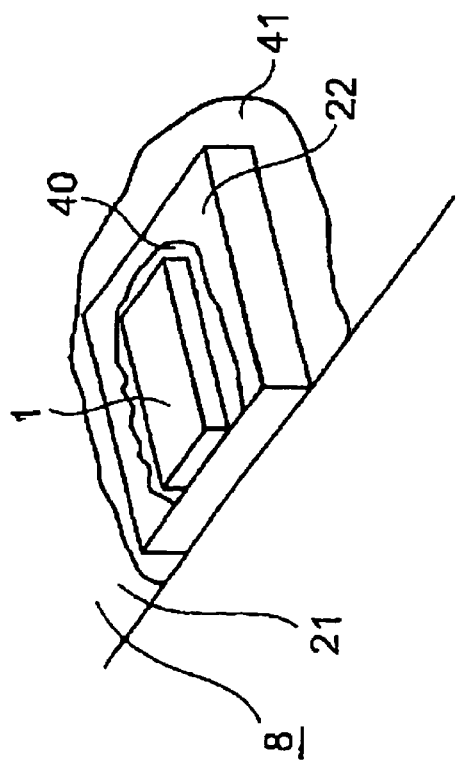
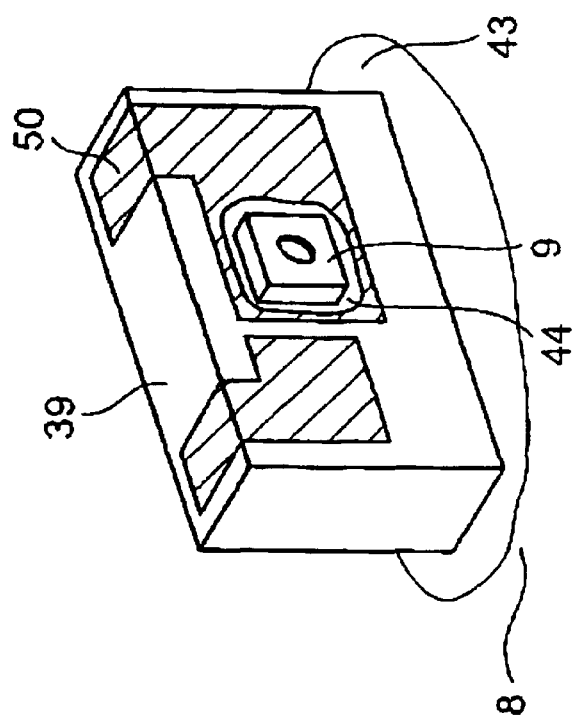
FIG. 8 (a)
FIG. 8 (b)

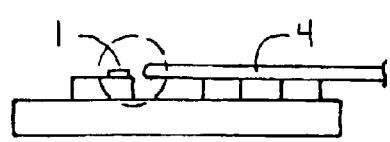
Fig. 13(a)
Fig. 14(a)
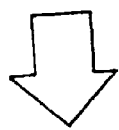
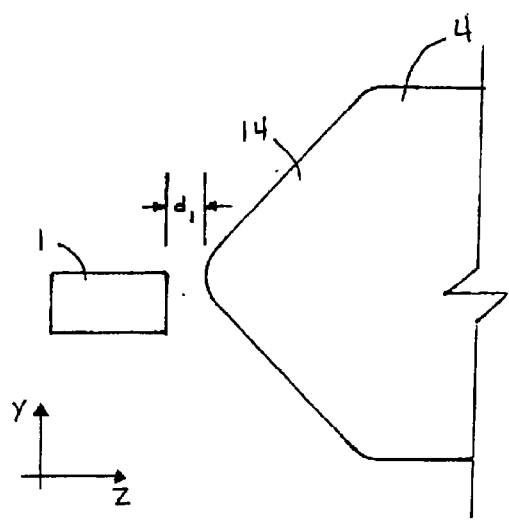
Fig. 13(b)
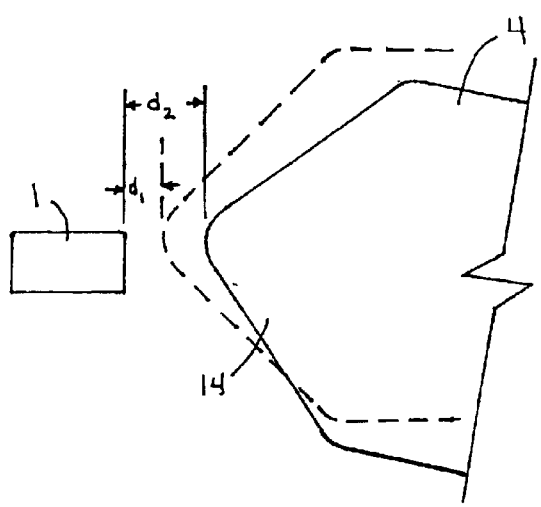
Fig. 14(b)

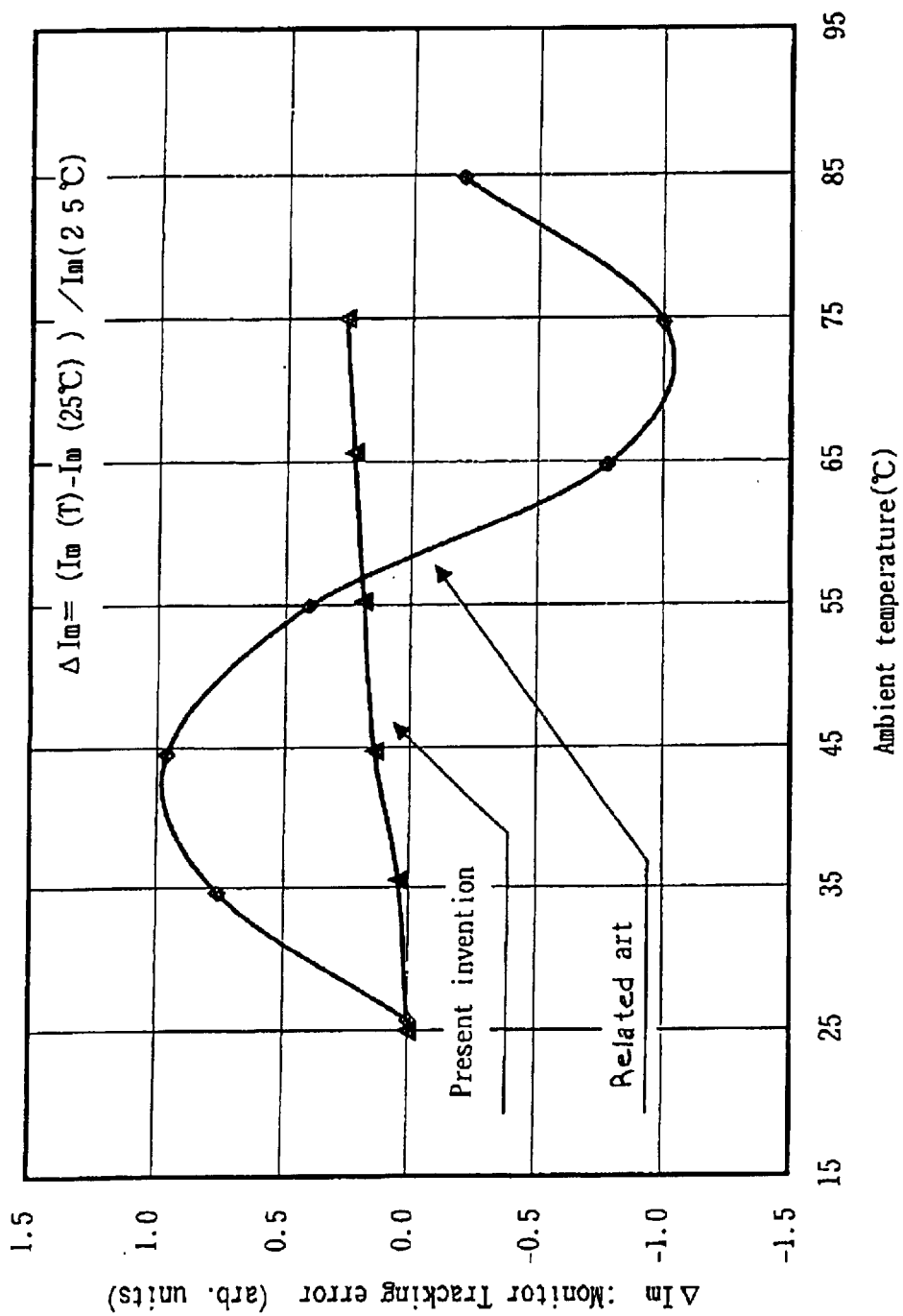
Fig. 15 Improvement in Monitor Tracking Error

SEMICONDUCTOR LASER DIODE MODULE

BACKGROUND OF THE INVENTION

1. Field of the Invention

The present invention relates to a semiconductor laser diode module used in the field of optical communications.

2. Discussion of the Background

With the explosive growth of the Internet and other communications needs, there has developed a commensurate need for transmission systems to handle the ever increasing demand for capacity to transmit signals. Fiber optic systems have become the technology of choice for meeting this demand. Significant attention has been directed to systems which use dense wavelength division multiplexing (DWDM) to increase the number of signal channels that can be transmitted through a single optical fiber.

Semiconductor laser diodes have been used as a pumping light source for optical fiber amplifiers and as a signal light source in the fiber optic systems. The semiconductor laser diode module is a device in which a laser beam from the semiconductor laser diode is optically coupled with an optical fiber.

Erbium doped fiber amplifiers require 980 nm band and 1480 nm band semiconductor laser diode modules as pumping light sources. And Raman amplifiers require 1350–1540 nm band semiconductor laser diode modules as pumping light sources. 1550 nm band semiconductor laser diode modules are well-known as the signal light source.

Optical coupling system between the laser diode and the optical fiber is selected depending on a laser diode chip structure, the shape of the mode-field of the light emitted from laser diode, and so on, to get higher optical coupling efficiency thereby.

The semiconductor laser diode module is required to have a certain quality of optical characteristics even at a higher ambient temperature. The optical characteristics are represented by the stability of the optical coupling efficiency between laser diode and the optical fiber, the stability of the output power from laser diode, and the monitor current.

SUMMARY OF THE INVENTION

The present invention advantageously provides a laser diode module in which a laser diode and an optical fiber are optically coupled with each other efficiently irrespective of an ambient temperature change.

An embodiment of the present invention advantageously provides a laser diode module including a laser diode, an optical system including an optical fiber and a lens portion, the optical system being configured to receive and transmit a beam emitted from the laser diode through the lens portion to the optical fiber along an optical axis, a base configured to support the laser diode and at least a portion of the optical system, and a bottom plate configured to support the laser diode, the optical system, and the base. The base includes a structural support member configured to prevent warping of the base, where the structural support member extends along the base in a direction generally parallel to the optical axis.

The present invention provides a semiconductor laser diode module having a structural support member that extends along the base in a direction generally parallel to the optical axis, thereby the structural support member acts to suppress warping of the base. Accordingly, the configuration of the present invention suppresses the degradation in optical coupling efficiency between the laser diode and the optical fiber due to the temperature change of the environmental conditions of the semiconductor laser diode module.

BRIEF DESCRIPTION OF THE DRAWINGS

A more complete appreciation of the invention and many of the attendant advantages thereof will become readily apparent with reference to the following detailed description, particularly when considered in conjunction with the accompanying drawings, in which:

FIGS. 7(a) and 7(b) are side and top views, respectively, of a lens portion of an optical fiber of the first embodiment of the semiconductor laser diode module according to the present invention;

FIGS. 8(a) and 8(b) are perspective views of an arrangement region of a laser diode and an arrangement region of a monitor photo diode, respectively, of the first embodiment of the semiconductor laser diode module according to the present invention;

FIGS. 13(a) and 13(b) are schematic representations of the related art semiconductor laser diode module depicting a non-operating state in FIG. 13(a), and an enlarged view of a portion of FIG. 13(a) depicting an optical coupling of the laser diode and optical fiber in FIG. 13(b);

FIGS. 14(a) and 14(b) are schematic representations of the related art semiconductor laser diode module depicting a operating state in FIG. 14(a), and an enlarged view of a portion of FIG. 14(a) depicting an optical coupling of the laser diode and optical fiber in FIG. 14(b) where the non-operating state is depicted in phantom lines for comparison;

FIG. 15 is a chart representing monitor tracking error based upon ambient temperature changes in the related art semiconductor laser diode module and the semiconductor laser diode module according to the present invention;

DETAILED DESCRIPTION OF THE INVENTION

Description of the Art for Comparison

Figure 12:
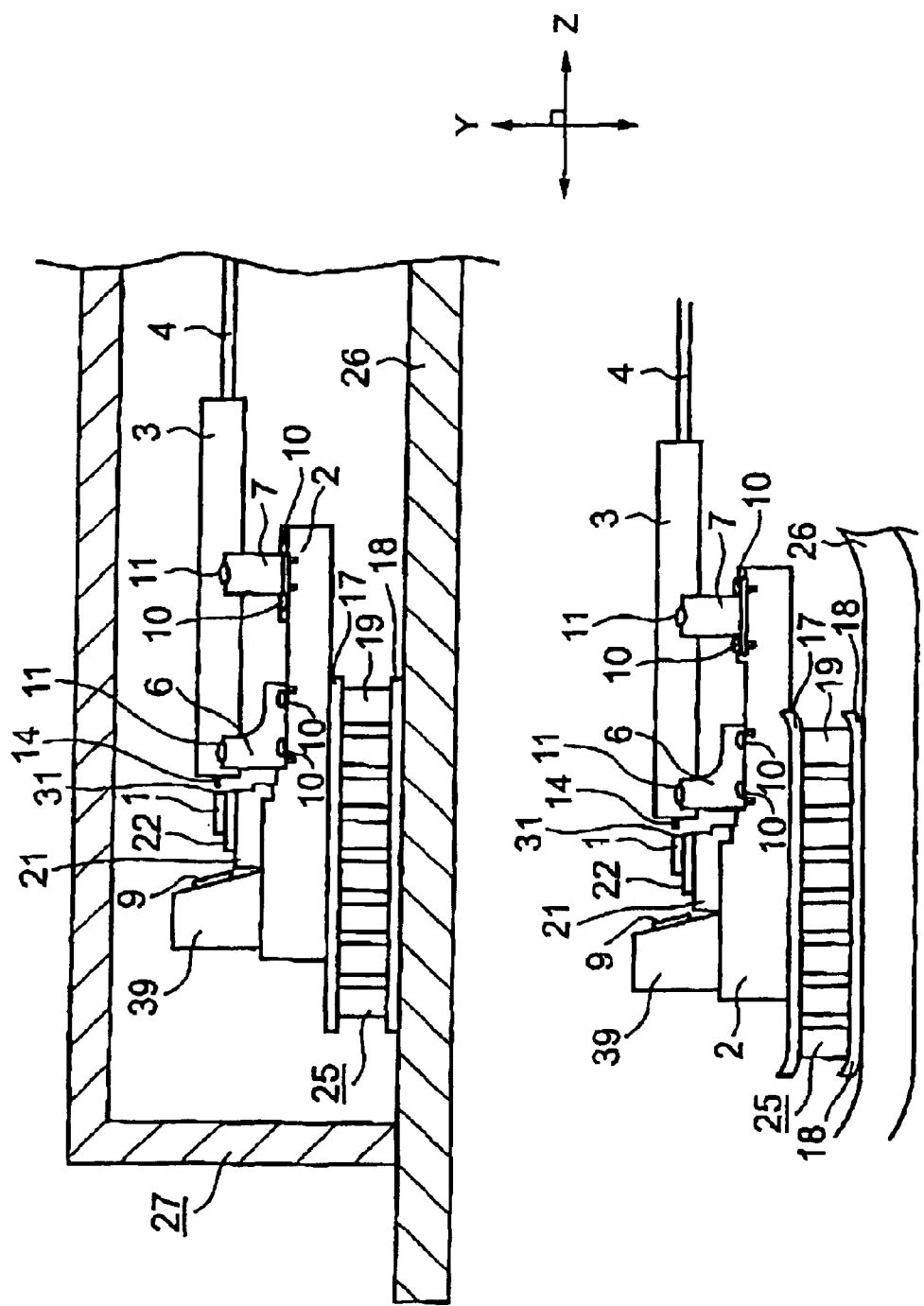
FIGS. 12(a) and 12(b) are cross-sectional, partial views of a related art semiconductor laser diode module depicted in a non-operating state in FIG. 12(a), and in a operating state in FIG. 12(b) where the module is depicted as being warped.

FIG. 12(a) depicts an example of a structure of a related semiconductor laser diode module for comparison. The semiconductor laser diode module depicted in FIG. 12(a) has a laser diode 1 for emitting a laser beam. The laser diode module includes an optical fiber 4 having a lens portion 14 provided opposite a laser beam emitting end surface 31 of the laser diode 1. The optical fiber 4 is accommodated in a sleeve 3 made of metal. The optical fiber 4 receives and transmits the beam emitted from the laser diode 1 through the lens portion 14. The lens portion 14 has a wedge-shape.

The sleeve 3 is supported by fastening members 6 and 7, which are mounted on a base 2. The fastening members 6 and 7 are configured to support the optical fiber 4 through the sleeve 3 at intervals in a longitudinal direction of the optical fiber 4. The laser diode 1 is mounted on and fixed to laser diode bonding portion 21 on the base 2 through a heat sink 22. A monitor photo diode 9 is mounted through a monitor photo diode carrier 39 to the base 2. The monitor photo diode 9 monitors the optical output power of the laser diode 1. The base 2 is mounted on a thermo module 25.

The thermo module 25, the base 2, the laser diode 1, the optical fiber 4 and the fastening members 6 and 7 are accommodated in a package 27. The thermo module 25 is mounted on a bottom plate 26 of the package 27. The bottom plate 26 of the package 27 is formed of a Cu—W alloy, specifically CuW20 (20% of Cu, 80% of W by weight). The thermo module 25 has a base side plate member 17, a bottom plate side plate member 18, and peltier elements 19 clamped between the plate members 17 and 18. The base side plate member 17 and the bottom plate side plate member 18 of the thermo module 25 are both made of $Al_2O_3$.

The fastening members 6 and 7 and the base 2 are welded together by a known welding method, such as laser welding using a YAG laser, at laser welding portions 10, and the fastening members 6 and 7 and the sleeve 3 are welded together at laser welding portions 11. The laser welding portions 11 are formed at a higher position in a Y-direction in FIGS. 12(a) and 12(b) than that of the welding portions 10.

In the above-described semiconductor laser diode module, the optical fiber 4 is aligned to the laser diode 1 so that the laser beam emitted from the laser diode 1 is received and transmitted in the optical fiber 4 for use as desired. Also, in the semiconductor laser diode module, when current for driving the laser diode 1 is turned on, the temperature of the laser diode 1 is increased by heat generation caused by the current. The increase in temperature changes an optical output power of the laser diode 1. Accordingly, during the operation of the semiconductor laser diode module, the temperature of the laser diode 1 is monitored by a thermistor (not shown) fixed in the vicinity of the laser diode 1, and the thermo module 25 is operated on the basis of the measured temperature value. The thermo module 25 is operated such that the current through the thermo module 25 is controlled in an effort to maintain a constant temperature of the laser diode 1 to keep the optical output power of laser diode constant.

The inventors of the present invention have identified a problem with the above-described semiconductor laser diode module. In the above-described semiconductor laser diode module, the base 2 is generally planar in shape. Thermal differences and/or differences in the thermal expansion coefficients between the base and any structures connected to the base (such as the thermo module 25) will cause the base 2 to warp. Since the base 2 is configured to have a planar shape, such warping forces will readily bend the base 2, and may permanently deform the base 2. In the flexed state the positions of the laser diode 1 and the optical fiber 4 are displaced from the aligned position, thereby degrading the optical coupling efficiency between the laser diode 1 and the optical fiber 4. If the optical coupling efficiency between the laser diode 1 and the optical fiber 4 is degraded in accordance with a change in ambient temperature, then the light intensity of the beam received and transmitted by the optical fiber 4 decreases, and it becomes impossible to suitably operate the optical communication system to which the semiconductor laser diode module is applied.

The inventors conducted a test on a semiconductor laser diode module as described above, and determined that a change in ambient temperature causes warping of the base, which in turn causes an end of the optical fiber to shift with respect to the laser diode. FIGS. 13(a) and 13(b) are schematic representations of such a semiconductor laser diode module depicting a lower ambient temperature state, i.e. 25° C. (room temperature) in FIG. 13(a), and an enlarged view of a portion of FIG. 13(a) depicting an optical coupling of the laser diode and optical fiber in FIG. 13(b). FIGS. 14(a) and 14(b) are schematic representations of the semiconductor laser diode module of FIGS. 13(a) and 13(b) depicted in a higher ambient temperature state, i.e. 85° C. in FIG. 14(a), and an enlarged view of a portion of FIG. 14(a) depicting an optical coupling of the laser diode and optical fiber in FIG. 14(b). In FIG. 14(b), the configuration of FIG. 13(b) is depicted in phantom lines for comparison.

As depicted in FIG. 13(b), in the lower ambient temperature state, the laser diode is a distance $d_1$ from the lens portion of the optical fiber. As depicted in FIG. 14(b), in the higher ambient temperature state the base 2 warps such that the laser diode is a distance $d_2$ from the lens portion of the optical fiber. The change of the distance from $d_1$ to $d_2$ become longer, then the stability of optical characteristics, for example, the stability of the optical coupling efficiency between laser diode and optical fiber, the stability of output power from laser diode, and the stability of the monitor current, are more reduced. It is necessary to suppress the warping of the base so as to minimize the change of distance $d_1$ and $d_2$ for improvement of these optical characteristics.
Description of the Preferred Embodiments of the Invention The present invention will now be described with reference to preferred embodiments that provide advantageous structures that overcome problems identified by the inventors, which are described above. In the detailed description of the embodiments, the same reference numerals will be used to indicate the same or similar components and a duplicated explanation will be omitted.

Figure 1:
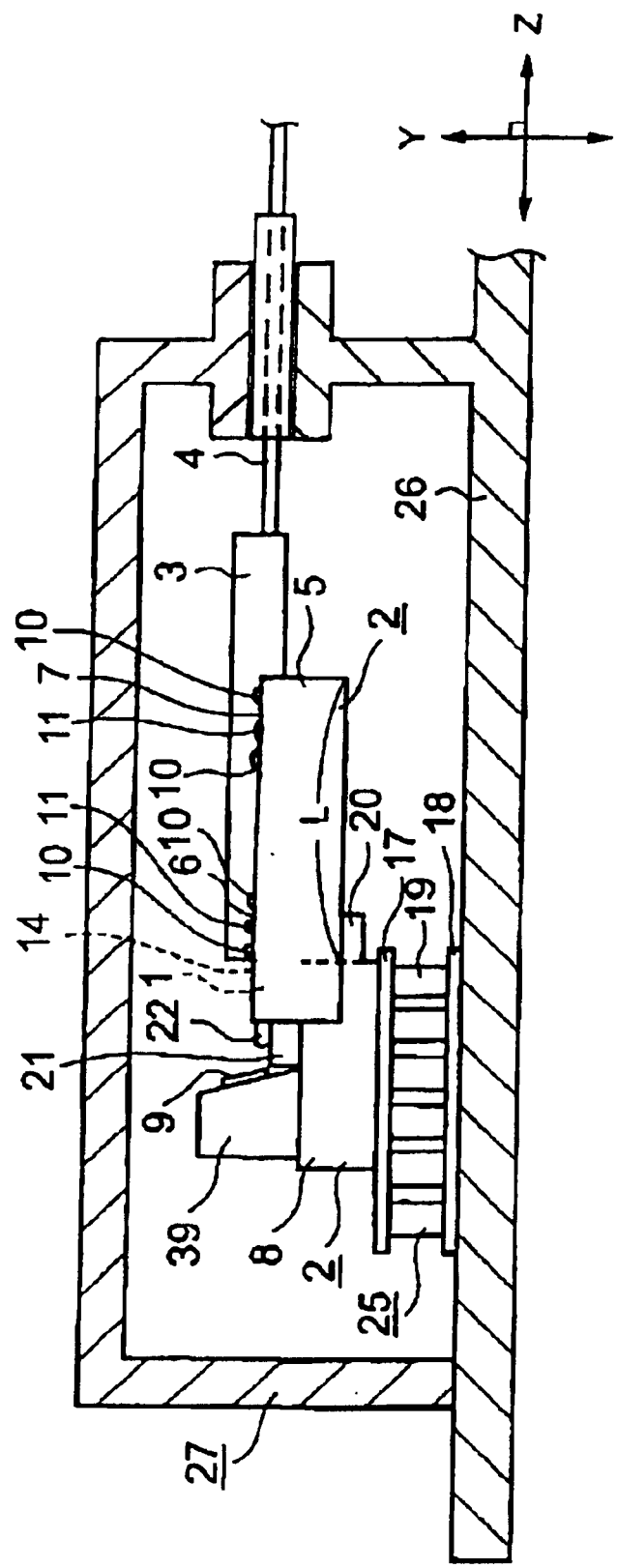
FIG. 1 is a cross-sectional view of a semiconductor laser diode module according to a first embodiment of the present invention.

Referring now to the drawings, FIGS. 1–8(b) depict a semiconductor laser diode module according to a first embodiment of the present invention. As depicted in FIG. 1, the semiconductor laser diode module includes a package 27 configured to accommodate a laser diode 1, an optical fiber 4 having a lens portion 14, a sleeve or ferrule (or more generally a holder) 3 for receiving therein the optical fiber 4, at least one fastening means or fastening members 6 and 7 (7a, 7b) for supporting the optical fiber 4 through the sleeve 3, a base 2 on which the fastening members 6 and 7 and the laser diode 1 are mounted directly or indirectly, and a thermo module 25.

Figure 2:
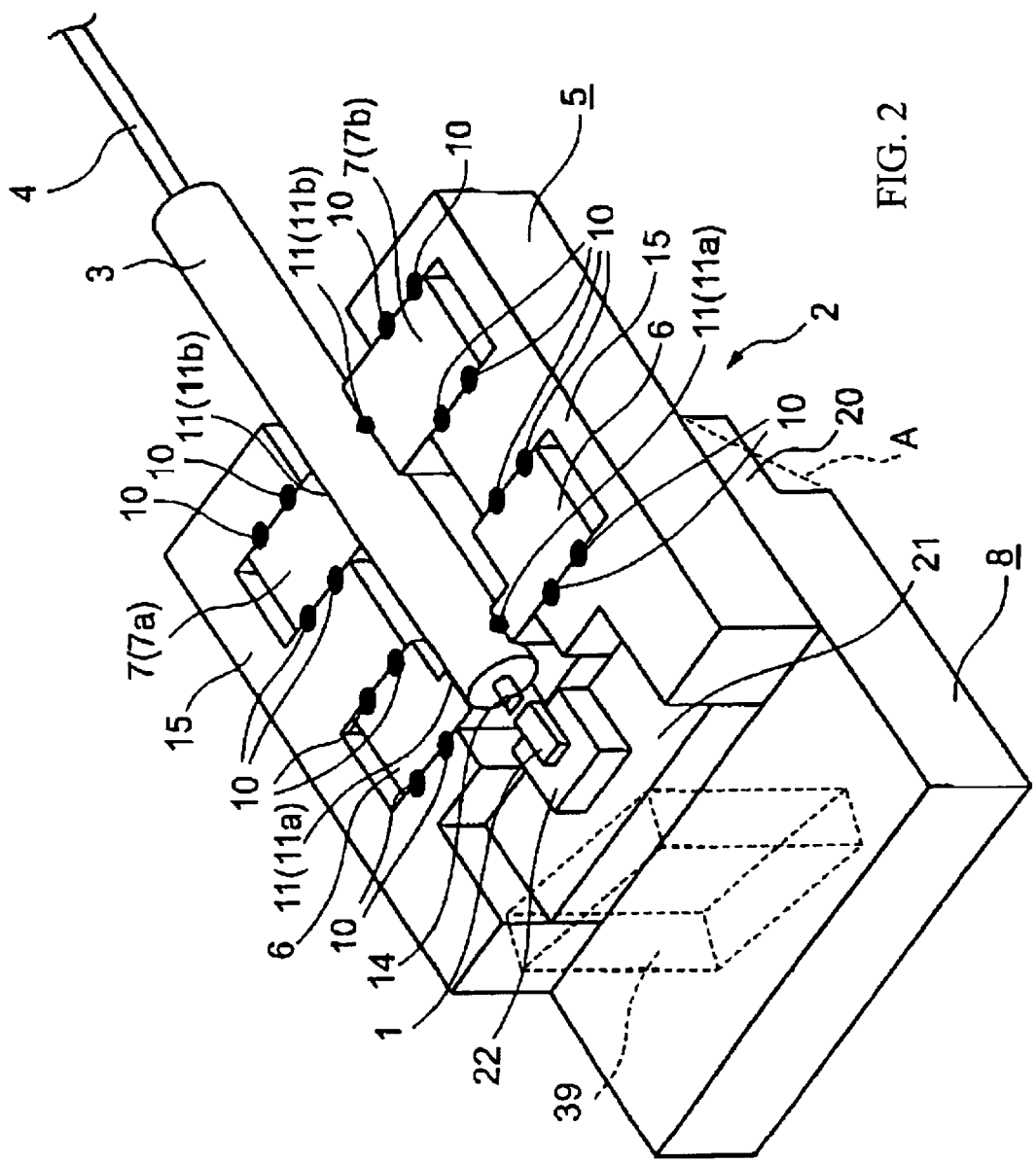
FIG. 2 is a perspective view of the internal components of the first embodiment of the semiconductor laser diode module according to the present invention.
Figure 4:
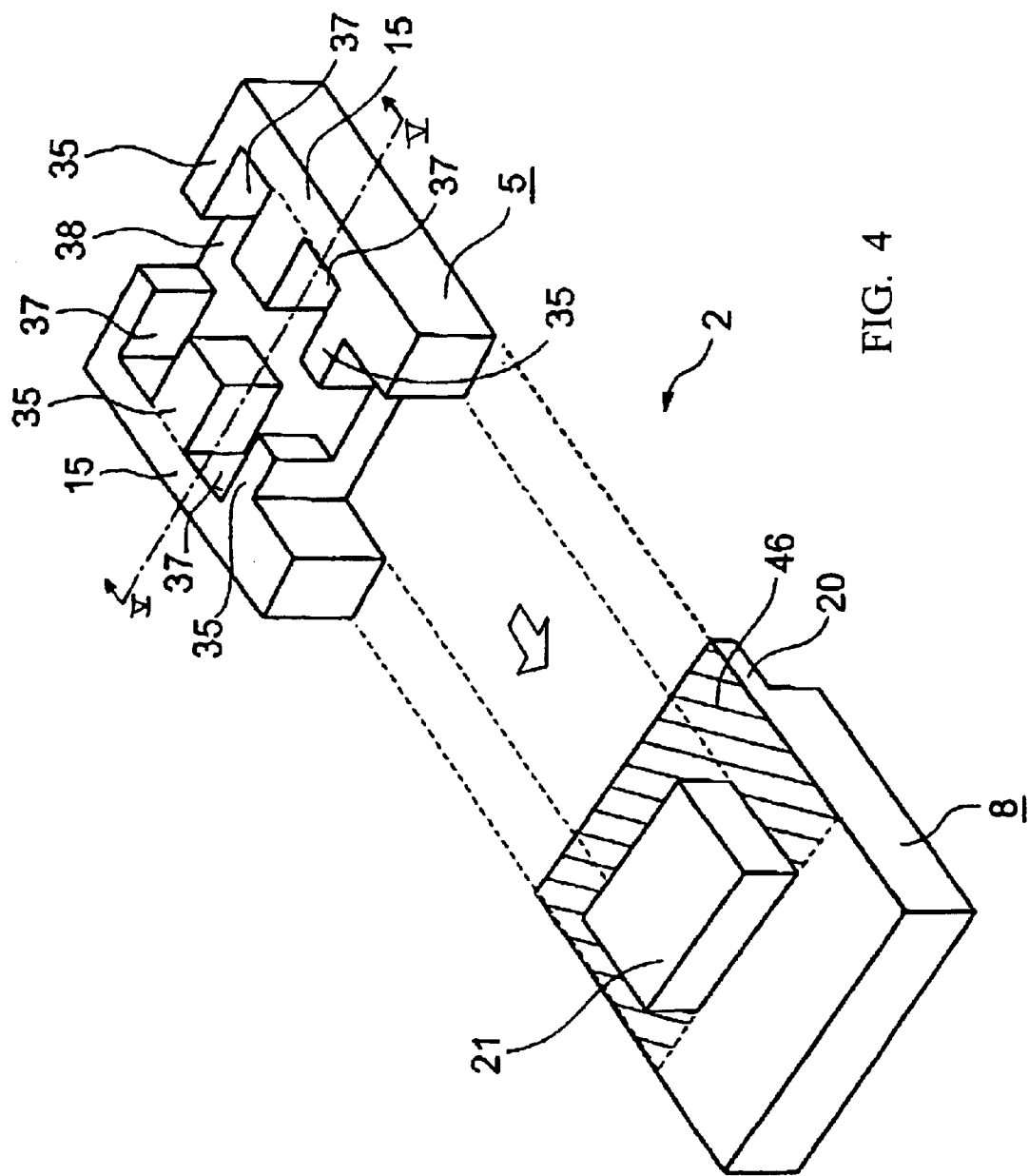
FIG. 4 is an exploded, perspective view of a base of the first embodiment of the semiconductor laser diode module according to the present invention.

The base 2 according to the first embodiment is advantageously provided with a laser diode mounting member 8 on which the laser diode 1 is to be mounted, and a fastening means mounting member or holder mounting member 5 on which the fastening members 6 and 7 are to be mounted. The laser diode mounting member 8 is arranged on the thermo module 25 in contact therewith, and as depicted in FIGS. 1, 2 and 4. The laser diode mounting member 8 has an upper portion with a laser diode bonding portion 21 formed integrally therewith, which defines a laser diode mounting region. The holder mounting member 5 is disposed in a position that does not interfere with the laser diode mounting region of the laser diode mounting member 8.

FIG. 4 is an exploded, perspective view of the base 2 including the holder mounting member 5 and the laser diode mounting member 8. The holder mounting member 5 is fixed on an upper surface of the laser diode mounting member 8 on a brazing portion 46 indicated by the hatching in FIG. 4. Note that in the preferred embodiment, portions of the holder mounting member 5 extend alongside the laser diode bonding portion 21.

The base 2 of the present invention is constructed of a laser diode mounting member 8 that is advantageously formed of material having a thermal expansion coefficient in a range between a thermal expansion coefficient of the holder mounting member 5 and a thermal expansion coefficient of a base side plate member 17 of the thermo module 25. For example, the laser diode mounting member 8 is preferably formed of a Cu—W alloy, such as CuW10 (Cu of 10%, W of 90% by weight), having a thermal expansion coefficient of about $6.5 \times 10^{-6}$. Further, the holder mounting member 5 is preferably formed of an Fe—Ni—Co alloy, such as Kovar®, having a thermal expansion coefficient in a range from $4.5 \times 10^{-6}$ to $5.1 \times 10^{-6}$, and the base side plate member 17 of the thermo module 25 is preferably formed of a material such as $Al_2O_3$, having a thermal expansion coefficient of about $6.7 \times 10^{-6}$.

During operation of the first embodiment of the laser diode module, a light beam is emitted from the laser diode 1 and is received and transmitted by the optical fiber 4. The thermo module 25 controls the temperature of the laser diode 1 during the operation of the laser diode 1. In the present invention, the laser diode mounting member 8, which is in contact with the base side plate member 17 of the thermo module 25, is advantageously made of material having a thermal expansion coefficient in the range between the thermal expansion coefficient of the holder mounting member 5 provided on the upper side thereof and the thermal expansion coefficient of the base side plate member 17 (i.e., in the present embodiment, CuW10 having the thermal expansion coefficient between that of Kovar® and that of $Al_2O_3$). By comparison, in the related art embodiment depicted in FIG. 12(a), the base 2, which is made of material having a low thermal expansion such as Kovar®, directly contacts and the plate member 17 of the thermo module 25, which is made of a material having a high thermal expansion coefficient such as $Al_2O_3$. Since the thermal expansion coefficients of adjacent contacting material in the present invention gradually change, rather than substantially increasing, as in the related art embodiment. The gradual increase in the thermal expansion coefficients of adjacent contacting material in the present invention reduces the warping or flexure of the base 2 generated due to the temperature gradients created during operation of the laser diode. Accordingly, the present invention provides a structure that suppresses the degradation in the optical coupling efficiency between the laser diode 1 and the optical fiber 4 due to the ambient temperature change during operation of the laser diode module.

The present invention advantageously preferably provides that the thermal expansion coefficient of the laser diode mounting member 8 is equal to the thermal expansion coefficient of the bottom plate 26 of the package 27. For example, both the laser diode mounting member 8 and the bottom plate are preferably formed of a Cu—W alloy, such as CuW10. Accordingly, the same magnitude of stress is applied to both upper and lower sides of the thermo module 25 when the temperature change of the semiconductor laser diode module is generated. Thus, the warping of the thermo module 25 is offset. Accordingly, the present invention provides a structure that effectively suppresses the degradation of the optical coupling efficiency between the laser diode 1 and the optical fiber 4 due to an ambient temperature change.

The sleeve 3, the fastening members 6 and 7, and the holder mounting member 5 are preferably joined together by laser welding. It is therefore preferable to construct the sleeve 3, the fastening members 6 and 7, and the holder mounting member 5 of a material that has low thermal conductivity and a low thermal expansion coefficient, and therefore has superior weldability, such as Kovar®. Additionally, the holder mounting member 5 is preferably made of a material having substantially the same thermal expansion coefficient as that of the optical fiber 4 and sleeve 3 in order to reduce any adverse effects on the optical fiber 4 due to a difference in thermal expansion coefficients. Accordingly, the present invention provides a semiconductor laser diode module that is easy to manufacture.

Additionally, in the present invention, the thermal conductivity of the laser diode mounting member 8 is advantageously preferably larger than the thermal conductivity of the holder mounting member 5. Such a configuration provides an advantageous thermal heat path from the laser diode 1 through the heat sink 22 and through the laser diode mounting member 8 (without insulation from the holder mounting member 5) to the thermo module 25 and to the bottom plate 26, thereby providing for the efficient transfer of heat away from the laser diode 1 during operation. For example, as noted above, the laser diode mounting member 8 is preferably formed of a Cu—W alloy, such as CuW10, and the holder mounting member 5 is preferably formed of an Fe—Ni—Co alloy, such as Kovar®. The thermal conductivity of CuW10 is in the range of about 180 to 200 W/mK, which is about ten times greater than the thermal conductivity of Kovar®, which is in the range of about 17 to 18 W/mK.

Accordingly, the present invention provides a heat path configuration through the laser diode mounting member 8 of the base that efficiently controls the temperature of the laser diode 1 using the thermo module 25, thereby allowing the laser diode 1 to operate at full, optimal power without the risk of overheating. The configuration of the present invention reduces the power consumption of the laser diode module as compared to the related art embodiment, since it allows the laser diode 1 to operate at optimal power and allows the thermo module 25 to efficiently transfer heat away from the laser diode without insulation interference from the holder mounting member. Accordingly, the present invention advantageously provides a semiconductor laser diode module that has small power consumption. Furthermore, the holder mounting member 5 of the present invention does not reach high temperatures, as did the entire base of the related art module, and therefore the overall warping of the base is reduced.

The holder mounting member 5 of the base 2 is provided to generally extend in a longitudinal direction of the optical fiber 4 from an end portion on an optical fiber mounting side of the thermo module 25 (i.e., at the right side of the thermo module 25 as depicted FIG. 1). Further, the holder mounting member 5 is provided on the upper surface of the laser diode mounting member 8. Additionally, the sleeve 3 holding the optical fiber 4 is fixed to the holder mounting member 5 and projects from the end portion on the optical fiber mounting side of the thermo module 25. In this configuration, the projecting portion of the holder mounting member 5 is out of contact with the thermo module 25 and therefore is not subjected to warping effects from the thermo module 25. Furthermore, since the sleeve 3 is fixed to the holder mounting member 5 and projects from the thermo module 25, then the sleeve 3 is not subjected to warping effects from the thermo module 25, thereby further effectively suppressing the reduction in optical coupling efficiency between the laser diode 1 and the optical fiber 4.

It should be noted that if the projection length L (see FIG. 1) of the holder mounting member 5 is too long, the bonding strength to the laser diode mounting member 8 may be insufficient due to the weight of the projecting portion of the projection length L. Accordingly, there is a possibility that the bonding would be released if the projecting portion is subjected to vibration. Therefore, it is preferable to establish a configuration where L≦5 mm.

As depicted in FIG. 2, the laser diode mounting member 8 preferably has a reinforcement portion 20 that extends under the projecting portion of the holder mounting member, and further preferably extends under the fastening member 6 located closer to the laser diode 1. In the first embodiment, the reinforcement portion 20 has a rectangular-parallelepiped shape. The reinforcement portion 20 supports and braces the holder mounting member 5, whereby if vibration is applied to the holder mounting member 5 in the Y-direction, then the effects of the vibration will be shifted to the laser diode mounting member 8. Such a configuration will prevent vibration from adversely effecting the optical coupling between the laser diode 1 and the optical fiber 4. Additionally, it is noted that the contact area between the holder mounting member 5 and the laser diode mounting member 8 can be increased so that both components are more firmly and more mechanically fixed together. Furthermore, it should be noted that since the lower surface of the reinforcement portion 20 is out of contact with the thermo module 25, then the reinforcement portion 20 is free from the adverse effects of the warping of the thermo module 25.

Figure 3:
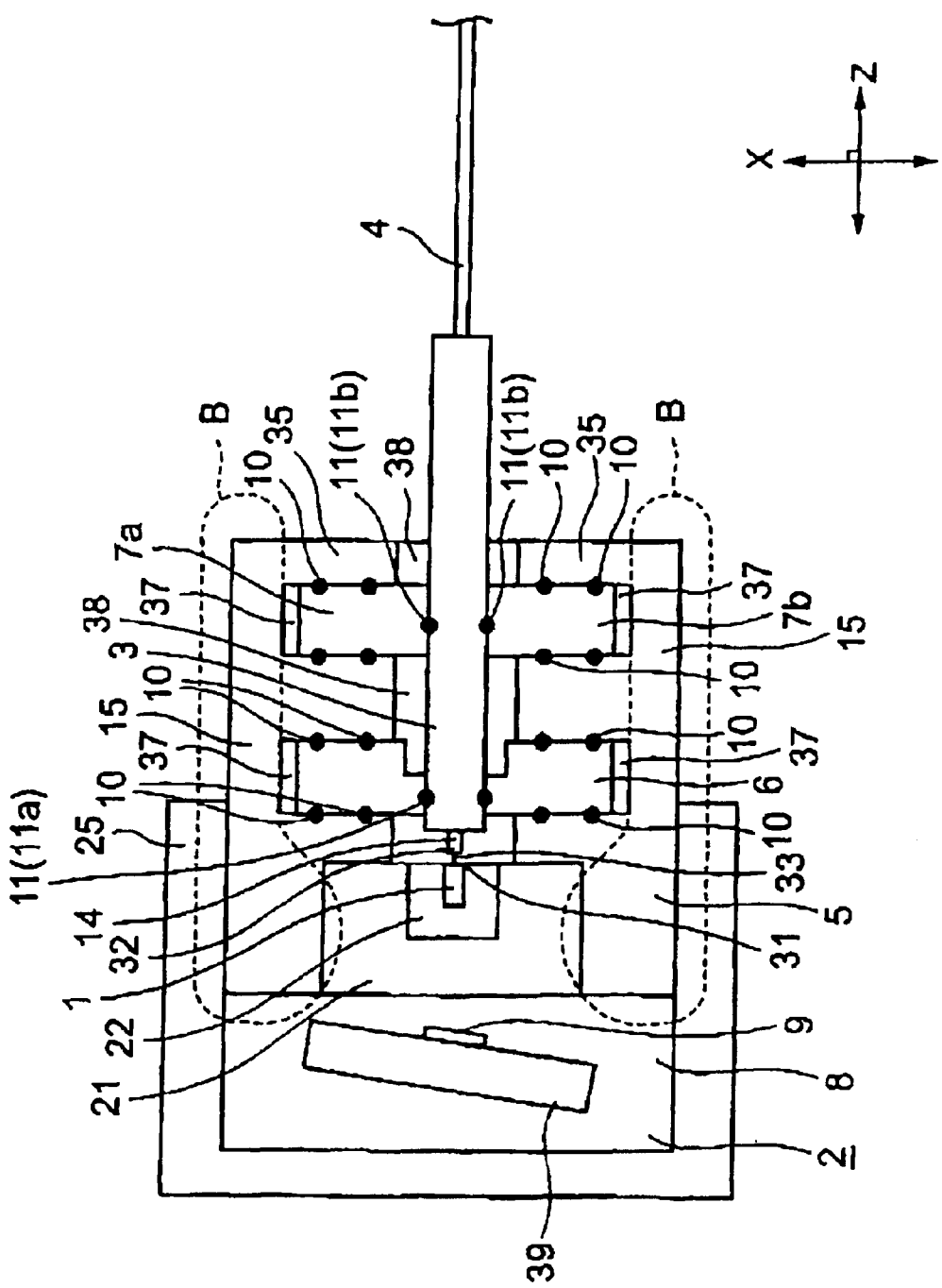
FIG. 3 is a top view of the internal components of the first embodiment of the semiconductor laser diode module according to the present invention.

As depicted in FIGS. 1 through 3, the fastening members 6 and 7 are joined to the holder mounting member 5 at first joint portions or positions 10, which are preferably formed using laser-welding techniques. The sleeve 3 is joined to the fastening members 6 and 7 at second joint portions or positions 11 (11a, 11b), which are also preferably formed using laser-welding techniques. The holder mounting member 5 is used to support the fastening members 6 and 7, and the fastening members 6 and 7 are used to support the sleeve 3 and thereby support the optical fiber 4. It should be noted that when the holder mounting member 5 and the fastening members 6 and 7 are welded together by laser beams, if the top surface of the holder mounting member 5 is flush with the top surface of the fastening members 6 and 7 (within ±100 μm), it is possible to readily keep constant the height of the laser welding portions 10 for every product.

The first joint positions 10 and the second joint positions 11 are preferably located at substantially a same distance from the bottom plate 26. Preferably, the first joint positions 10 and the second joint positions 11 are at substantially a same height in a direction perpendicular to the bottom plate 26, with a tolerance for a difference in height therebetween of within ±500 μm and more preferably within ±50 μm. Preferably, the first joint positions 10 and the second joint positions 11 are coplanar with the active layer of the laser diode 1, for example, the height of the first and second joint positions 10 and 11 are at substantially the same height as the ridge line 14a (refer to FIGS. 7(a), 7(b)) of the optical fiber 4 which is opposite the active layer of the laser diode 1.

The present invention advantageously provides at least one first joint position 10 joining the holder mounting member 5 of the base 2 and the fastening members 6 and 7 of the optical fiber receiving sleeve 3, and at least one second joint position 11 joining the fastening members 6 and 7 and the sleeve 3, where the first and second joint positions are formed to be at substantially the same height level in the direction perpendicular to the package bottom plate 26. Accordingly, even if the base 2 is warped slightly, there is little possibility that the sleeve 3 would be displaced about the pivot of the first joint position 10 due to this warping. It is therefore possible to effectively suppress the degradation of the optical coupling efficiency between the laser diode 1 and the optical fiber 4.

Figure 5:
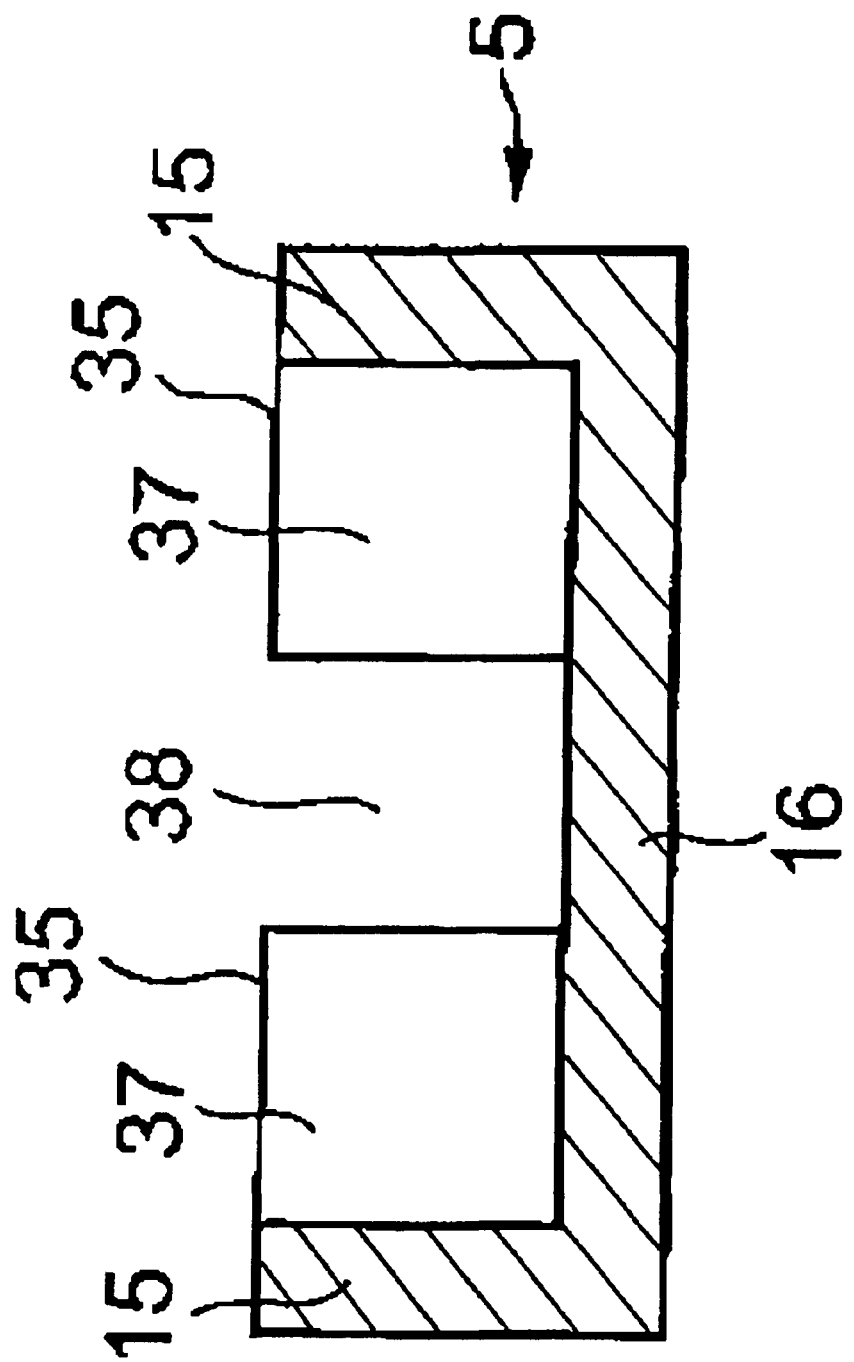
FIG. 5 is a cross-sectional view of a holder mounting member of the first embodiment of the semiconductor laser diode module according to the present invention taken along line V—V in FIG. 4.

In the first embodiment as depicted in FIGS. 3 and 5, at least one structural support member or warping preventing means 15 is formed along a longitudinal direction of the optical fiber 4 in the holder mounting member 5 of the base 2. The structural support member 15 functions to prevent the warping of the base 2 by providing a portion having a thickness that provides structural integrity to the base 2. In this embodiment, the structural support member 15 is formed as a wall portion extending in a longitudinal direction of the optical fiber 4 and provided upright on at least the upper side of a bottom portion 16 of the holder mounting member 5, as depicted in FIG. 5. In the first embodiment, the structural support members 15 are formed integrally with the holder mounting member 5. Therefore, there is no degradation in mechanical strength due to the connection between the structural support members 15 and the holder mounting member 5, as compared with an embodiment where the structural support members 15 and the holder mounting member 5 are discretely formed to be adhered together.

Figure 22:
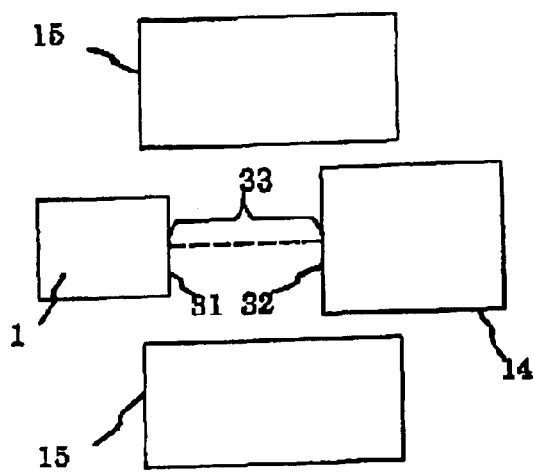
FIG. 22 is a top view of a conceptual arrangement between a laser diode, a lens portion and a structural support member of the present invention.

The first embodiment advantageously includes a structural support member that extends along the longitudinal direction (Z-direction in FIG. 1) of the holder mounting member 5. Preferably, the structural support member 15 is provided over a full region along the longitudinal direction of the holder mounting member 5 (the region within the frames B indicated by the dotted lines in FIG. 3). Additionally, the structural support member 15 is preferably formed on both sides of the holder mounting member 5 symmetrically about an optical axis of the optical fiber 4, a portion 33 of the optical axis being depicted in FIGS. 3 and 22 as extending to connect the laser beam emitting facet 31 of the laser diode 1 and a laser beam receiving end 32 of the optical fiber 4. The structural support member 15 preferably includes portions that are formed on both sides of the fastening member 6 located closer to the laser diode 1. Tip end portions of the structural support member 15 extend to the region adjacent to the laser diode bonding portion 21 of the laser diode mounting member 8, such that the tip end portions are provided on both sides of the laser diode bonding portion 21. The tip end portions adjacent the laser diode bonding portion 21 provide rigidity to the region between the laser diode 1 and the optical fiber 4, thereby maintaining efficient optical coupling. Therefore, the warping of the base 2 in the region where the axial portion 33 and the fastening member 6 are arranged is effectively suppressed. The first embodiment of the present invention thus effectively suppresses the warping of the base 2 due to a temperature change during operation of the semiconductor laser diode module, thereby effectively suppressing degradation in the optical coupling efficiency between the laser diode 1 and the optical fiber 4.

As depicted in FIGS. 3 and 4, the holder mounting member 5 includes fitting recess portions 37 for receiving the fastening members 6 and 7. The fitting recess portions 37 are defined by the wall portions constituting the structural support members 15 and the wall portions 35 for fastening the sides of the fastening members 6 and 7. The fastening members 6 and 7 are welded and fixed at the first joint positions 10, such that the fastening members 6 and 7 are received within the fitting recess portions 37. Incidentally, in the first embodiment, the wall portions 35 are part of the structural support members 15 and therefore constituting a warping preventing means. The wall portions 35 can be integrally formed on the holder mounting member 5 by, for example, cutting away the fitting recess portions 37 for receiving the fastening members 6 and 7 and an insertion portion for inserting the sleeve 3, as in the configuration depicted in FIG. 4.

The holder mounting member 5 has a U-shaped cross-sectional area taken along a plane transverse to the optical axis of the optical fiber, as depicted in FIG. 5. The structural support members 15 provide the side walls of the U-shaped cross-sectional area, and give the holder mounting member 5 structural integrity that prevents the warping of the holder mounting member 5. Alternatively, the holder mounting member 5 can be formed with a different cross-sectional shape, such as an H-shape, etc.

Wall portions 35 extended to the laser diode side and the laser diode bonding portion 21 also form together the U-shaped cross-sectional area around the laser diode 1 together.

As depicted in FIGS. 2 and 3, the fastening members 6 and 7 are separated to support the sleeve 3 and the optical fiber 4 at different positions at intervals along the longitudinal direction of the optical fiber 4. The fastening member 6 is located at the closest position (as compared to the fastening member 7) to the laser diode 1 and is preferably formed of an integral member with a clamping portion 28 for clamping the sleeve 3 and the optical fiber 4 at both sides. The fastening member 6 preferably has a U-shaped cross-sectional area.

Figure 6A:
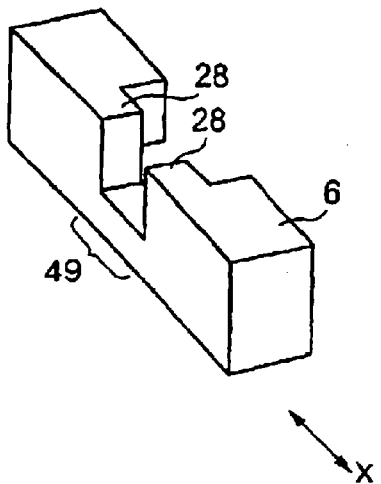
FIGS. 6(a), 6(b), 6(c), and 6(d) are perspective views of alternative embodiments of fastening members of the first embodiment of the semiconductor laser diode module according to the present invention.
Figure 6B:
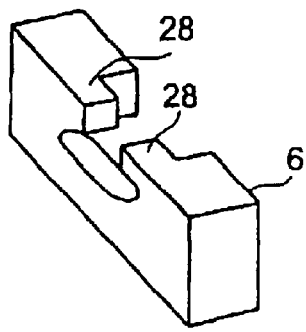
Figure 6C:
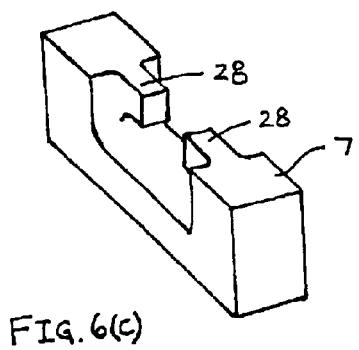
Figure 6D:
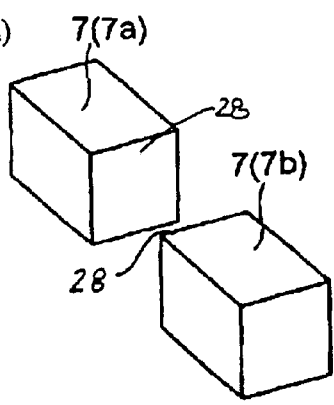

FIGS. 6(a), 6(b), 6(c), and 6(d) depict various embodiments of fastening members that can be used either as fastening member 6 or as fastening member 7. Note that the embodiments depicted in FIGS. 6(a) and 6(b) are preferably used as fastening member 6, since the clamping portions 28 of these embodiments are configured to be positioned as close as possible to the laser diode 1, which allows for more precise alignment between the laser diode 1 and the optical fiber 4. Note that the embodiments depicted in FIGS. 6(c) and 6(d) are preferably used as fastening member 7, since the positioning of the clamping portions 28 are not as crucial. The integrated fastening member 7 depicted in FIG. 6(c) can be used advantageously to have a predetermined position and width of clamping portions 28. The fastening member 7 depicted in FIG. 6(d) has the separate portions 7a and 7b that can clamp together the sleeve 3 tightly. Additionally, using an embodiment as depicted in FIG. 6(a) is preferred, since the fastening member of FIG. 6(a) includes a joint portion 49 that prevents warping of the base 2 in the X-direction, as compared with the a fastening member as depicted in FIG. 6(d), which has two separate fastening parts each supporting one side of the optical fiber 4.

During the manufacturing process, the optical fiber 4 is moved around the second joint positions 11 in order for the optical fiber 4 to be optically coupled with the laser diode 1. Accordingly, if the clamping portions 28 of the fastening member 6 are formed to have an arm-shape as depicted in FIG. 6(b), then the stress applied to the second joint positions 11 when the optical fiber 4 is moved together with the sleeve 3 around the second joint positions 11 is dispersed as deformation stress on the arm of the clamping portion 28, thereby making it possible to reduce the effect of stress concentrations.

The present invention includes an optical system that generally includes a lens portion and an optical fiber. In the first embodiment the lens portion 14 is a wedge-shaped anamorphic (rotationally asymmetric) lens integrated into the optical fiber 4 and having a structure depicted in FIGS. 7(a) and 7(b). In detail, ridge line 14a has a cylindrical surface. As depicted in FIGS. 2, 3 and 7, a ridge line 14a at a tip end faces a laser beam emitting face 31 of the laser diode 1 such that the ridge line 14a is in the same plane as an active layer of the laser diode 1. Although the optical fiber 4 preferably has an anamorphic, wedge-shaped lens portion 14 as depicted in FIGS. 7(a) and 7(b), the optical fiber 4 can alternatively be constructed as an anamorphic lens portion other than the wedge-shape portion, or as a fiber lens portion other than an anamorphic lens portion.

Figure 23A:
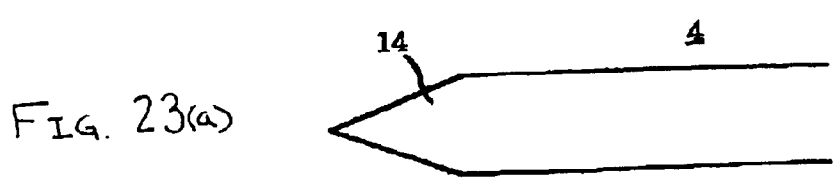
FIGS. 23(a) and (b) are side and top views of an alternative embodiment of a lens portion of an optical fiber according to the present invention.
Figure 23B:
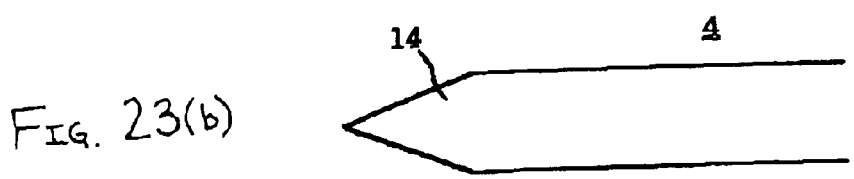

The shape of the fiber lens is not limited to a wedge shape. An alternative embodiment of the lens portion 14 is a conical shaped, rotationally symmetric lens (similar in shape to an end of a sharpened pencil) that is integrated into the optical fiber 4, as depicted in FIGS. 23(a) and 23(b). More specifically, the tip of the cone of such a fiber lens has a spherical surface. The fiber lens depicted in FIGS. 23(a) and 23(b) is commonly called "a tapered lens ended fiber" or "a semi-spherically lensed fiber."

Alternatively, the optical system can be constructed to have a discrete lens supported by the holder mounting member 5, an optical isolator supported by the holder mounting member 5, a second lens supported by the package 27, and an optical fiber supported by the package 27. (See the discussion for the third and fourth embodiments, which are depicted in FIGS. 16–21, for a similar configuration.) In this configuration, the lens portion 14 is constructed as a discrete lens portion from the optical fiber 4 such that the discrete lens portion, the optical isolator, and the second lens are provided between the laser diode 1 and the tip end of the optical fiber 4. In such a configuration, the optical isolator is preferably mounted using a material having minimal magnetic properties, such as SUS 430, in order to reduce interference with the optical isolator.

As depicted in FIG. 8(a), the laser diode 1 is preferably fixed on the heat sink 22 by, for example, AuSn or AuSi solder, and the heat sink 22 is fixed on the laser diode mounting member 8 by, for example, AuSn or AuSi solder. The heat sink 22 is preferably formed of material of high thermal conductivity such as AlN or diamond. As depicted in FIG. 8(b), the monitor photo diode carrier 39 is fixed on the laser diode mounting member 8 of the base 2 by soldering material 43. The monitor photo diode carrier 39 is preferably formed mainly of alumina. An Au plating pattern 50 is formed on the surface of the monitor photo diode carrier 39. The photo diode 9 is fixed on the plating pattern 50 by soldering material 44, such as AuSn.

Figure 9:
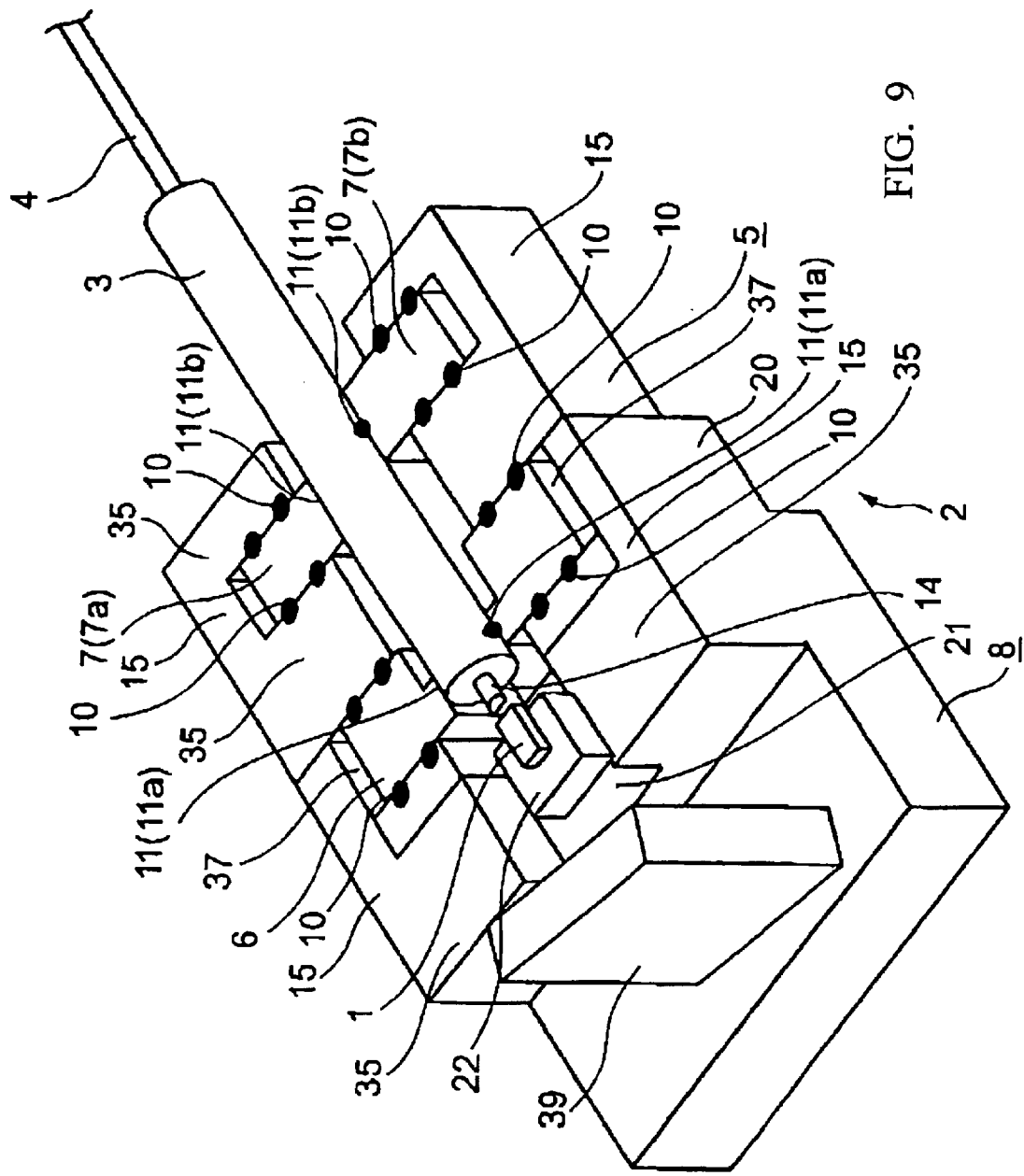
FIG. 9 is a perspective view of the internal components of a second embodiment of the semiconductor laser diode module according to the present invention.
Figure 10:
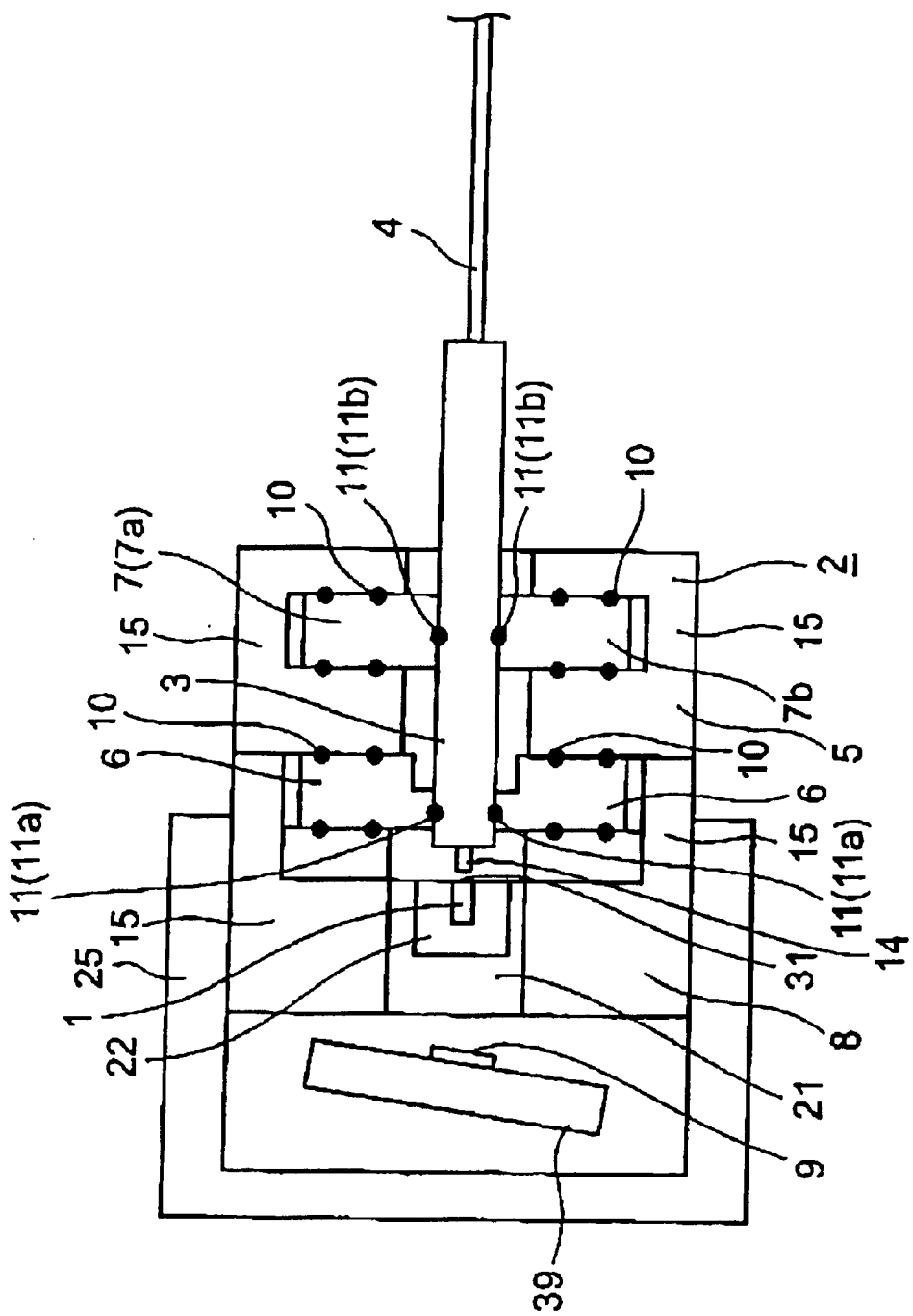
FIG. 10 is a plan view of the internal components of the second embodiment of the semiconductor laser diode module according to the present invention.
Figure 11:
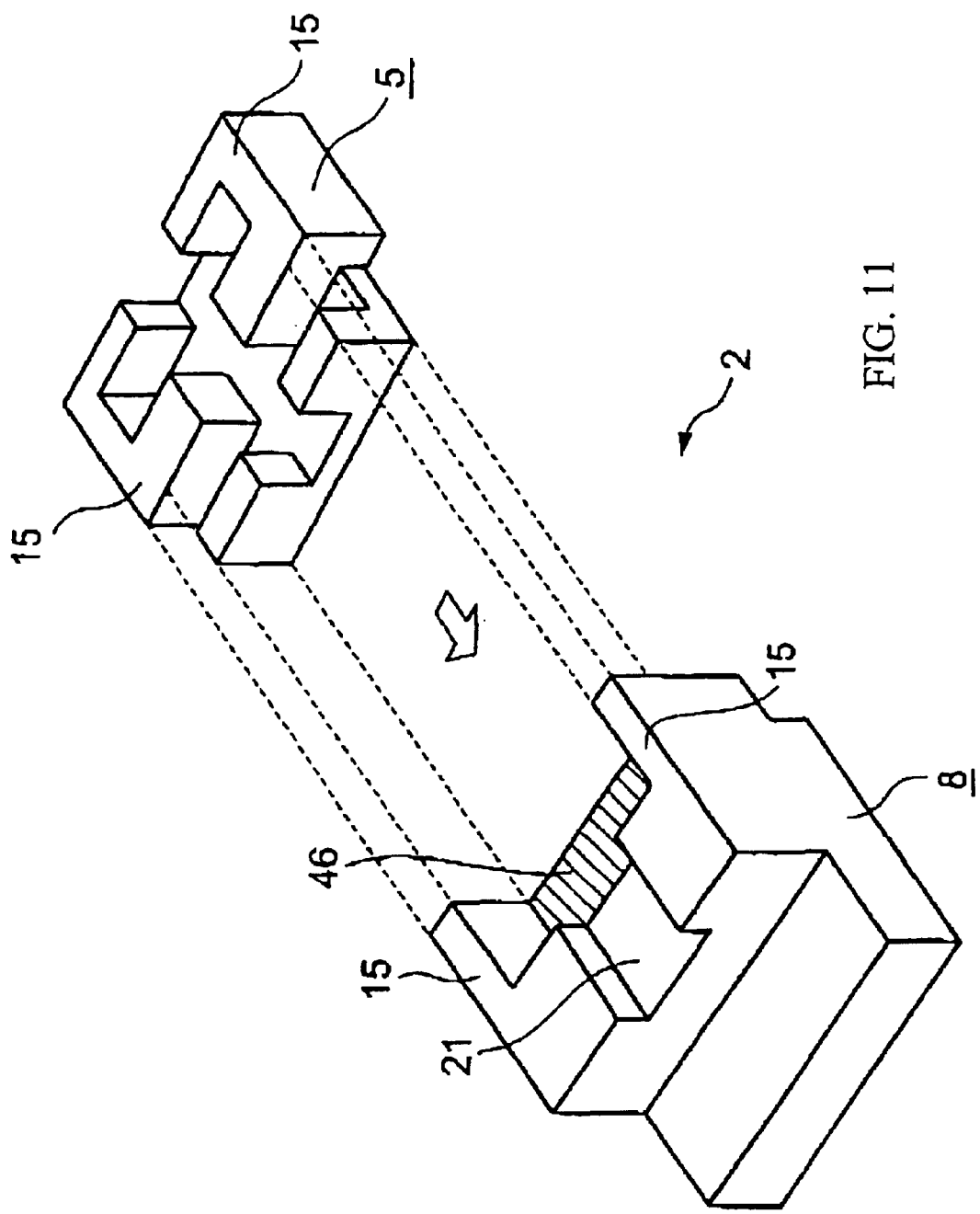
FIG. 11 is an exploded, perspective view of a base of the second embodiment of the semiconductor laser diode module according to the present invention.

FIGS. 9 and 10 depict the internal components of a second embodiment of the semiconductor laser diode module according to the present invention, where the thermo module 25 and the package 27 have been omitted. FIG. 11 is an exploded, perspective view of a base 2 of the second embodiment of the semiconductor laser diode module according to the present invention.

The second embodiment enjoys substantially the same advantages as those of the above-described first embodiment. The feature of the second embodiment that is different from the first embodiment is the unique shapes of the holder mounting member 5 and the laser diode mounting member 8 which constitute the base 2. More specifically, in the second embodiment the structural support members 15 are formed on both the holder mounting member 5 and the laser diode mounting member 8. The structural support members 15 are provided on both sides of the axial portion 33 connecting the laser beam emitting facet 31 of the laser diode 1 and the laser beam receiving end 32 of the optical fiber 4 and on both sides of the fastening member 6 located closer to the laser diode 1. The structural support members 15 are preferably formed integrally with the holder mounting member 5 and integrally with the laser diode mounting member 8.

The present invention is not limited to the above-described embodiments but may take various forms. The following discussion describes various exemplary alternative configurations of the present invention.

The laser diode module according to the present invention preferably includes a thermo module 25 in order to control the temperature of the laser diode 1, as described above. However, the laser diode module of the present invention can be constructed without a thermo module, such that the base 2 is supported by or integrated into the bottom plate 26. Such a configuration is required, for example, in undersea application due to the suppression of electric power consumption.

The first and second embodiments depict structural support members 15 that are formed as wall portions extending in the longitudinal direction of the optical fiber and provided upright on an upper side of the holder mounting member 5 or the laser diode mounting member 8. However, the configuration of the structural support members 15 is not limited to the specific shape depicted in the figures, but rather can be configured in alternative shapes, for instance, rod-shaped, or angular shaped one, which are attached to the base 2 by, for example, adhesives or solder.

Furthermore, in each of the foregoing embodiments, the holder mounting member 5 of the base 2 is preferably provided to project in the longitudinal direction of the optical fiber 4 from the end portion on the optical fiber mounting side of the laser diode mounting member 8. However, it is not necessary to provide the holder mounting member 5 of the base 2 so as to project from the laser diode mounting member 8 as described above. Other configurations can be used as will be readily apparent to one of skill in the art based upon the teaching set forth herein.

In each of the foregoing embodiments, the laser diode mounting member 8 preferably has a reinforcement portion 20 formed under the fastening member 6 located on the closest side to the laser diode 1. Alternatively, it is possible to dispense with the reinforcement portion 20. However, since the reinforcement portion 20 is provided to suppress the vibration of the holder mounting member 5 in the Y-direction of the drawings, it is preferable to provide the reinforcement portion 20. Furthermore, the configuration of the reinforcement portion 20 is not limited to any particular shape, but rather may be selected as desired. For instance, the reinforcement portion 20 may take a structure having a tapered surface, as indicated by phantom lines A in FIG. 2.

Although the laser diode mounting member 8 and the bottom plate 26 of the package 27 of the preferred embodiments are made of the same material to have the same thermal expansion coefficient, it is possible to use different materials for the laser diode mounting member 8 and the bottom plate 26. However, in this configuration it is preferable if the thermal expansion coefficients of the different materials are substantially the same.

The present invention provides a structure that advantageously reduces any degradation in the optical characteristics, i.e. the optical coupling efficiency of the laser diode module, due to the changes in the ambient temperature of the module. As described earlier with respect to FIGS. 7(a) and 7(b), the optical fiber 4 of the first embodiment has the wedge-shaped lens portion 14 with the ridge line 14a at a tip end in parallel with the X-Z plane. The optical coupling between the lens portion 14 of the optical fiber 4 and the laser diode 1 is susceptible to adverse effects of positional displacement, in particular, in the Y-direction if bending of the module occurs, as seen with respect to the related embodiment depicted in FIGS. 12(a), 12(b), 13(a), 13(b), 14(a), and 14(b).

When the base 2 is warped along the longitudinal direction of the optical fiber 4, the degradation in optical coupling efficiency between the laser diode 1 and the optical fiber 4 is likely to significantly occur. However, in accordance with the first embodiment of the present invention, the warping of the base 2 along the longitudinal direction of the optical fiber 4 is suppressed by the structural support members 15, thereby the stability of the optical coupling efficiency between the laser diode 1 and the optical fiber 4.

In the first and second embodiments, since the light emitted from the laser diode 1 is introduced from the tip end side of the optical fiber 4 into the optical fiber 4, it is important to suppress the positional displacement between the laser diode 1 and a laser beam receiving end 32 of the optical fiber 4. It is therefore important to suppress the warping of the base 2 at the axial portion 33. Additionally, a displacement in the fastened position of the sleeve 3 by the fastening member 6 will cause a greater degradation in coupling efficiency as compared to that by the fastening member 7, which is located further from the laser diode 1 than the fastening member 6. Therefore, it is important to suppress the warping of the base 2 in the region where the fastening member 6 is arranged. The present invention achieves such an advantageous structure.

FIG. 15 is a chart representing monitor tracking error delta Im based upon ambient temperature changes in the semiconductor laser diode module of the related art and of the present invention. The monitor tracking error is defined as $\Delta Im=(Im(T)-Im(25°\ C.))/Im(25°\ C.)$. In the laser diode module according to the present invention, since the warping of the base is suppressed, the sinusoidal change in the back-facet monitor current due to the change in ambient temperature is suppressed. As depicted in FIG. 15, the tracking error ($\Delta Im$) of the laser diode module of the present invention appears to change with a longer period than the related art laser diode module, which demonstrates that the various warping prevention means of the present invention function to prevent the displacement of the fiber-end with respect to the laser diode.

A third embodiment of the present invention will be hereinafter described with reference to FIGS. 16–20.

The third embodiment is an example of a system coupling a discrete lens to a laser diode where the semiconductor laser diode module has a wavelength 1480 nm band that is applied to an optical amplifier of a submarine system or a metro system. Obviously, it is difficult to frequently replace a semiconductor laser diode module applied to an optical amplifier of a submarine cable after installing it, therefore it is necessary to realize long term reliability of the semiconductor laser diode module. Accordingly, the laser diode module must be constructed to prevent optical coupling dislocation between the laser diode and the discrete lens due to the deflection of the base over a long period of time. Deflection of the base can be cause by various factors, such as distortion of the package due to screwing when the semiconductor laser diode module is fixed to a printed board, warp of the various portions of the module due to difference in temperature of contacting portions, and deflection due to a difference of thermal expansion coefficient between contacting portions.

The third embodiment of the present invention has been devised in view of the above and other concerns. The present invention provides a semiconductor laser diode module with high long term reliability which can satisfactorily maintain optical coupling between a luminous element such as a laser diode and a discrete lens.

Figure 16:
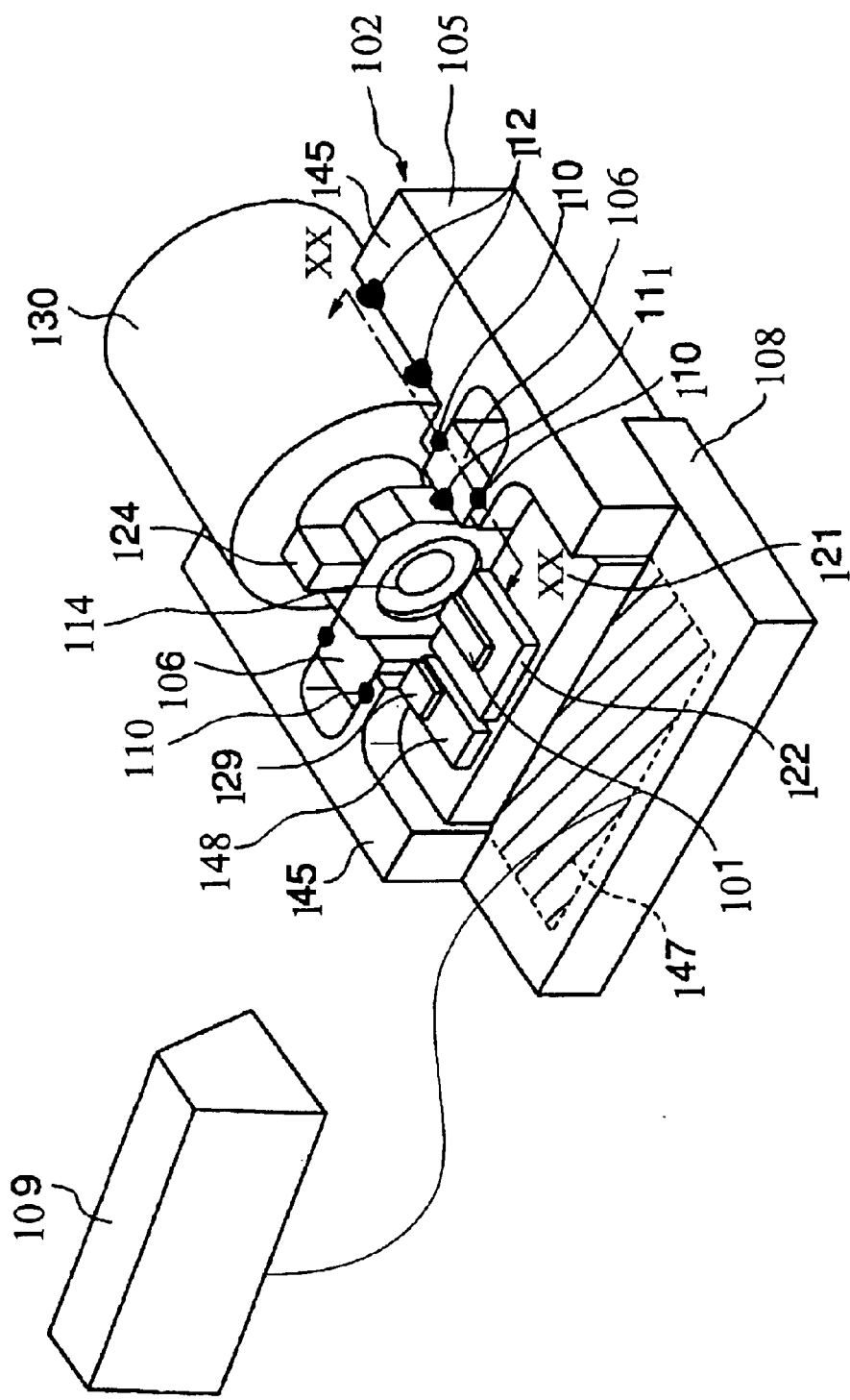
FIG. 16 is a perspective view of the internal components of a third embodiment of the semiconductor laser diode module according to the present invention.
Figure 17:
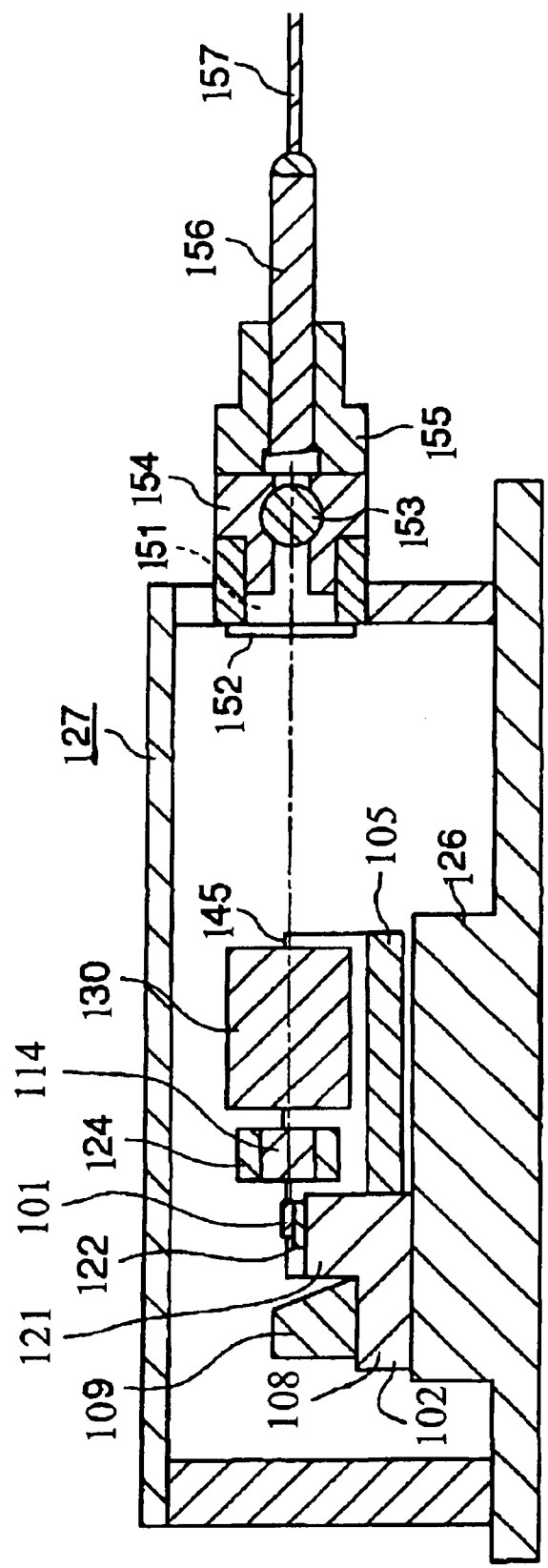
FIG. 17 is a cross-sectional view of the semiconductor laser diode module according to the third embodiment of the present invention.
Figure 18:
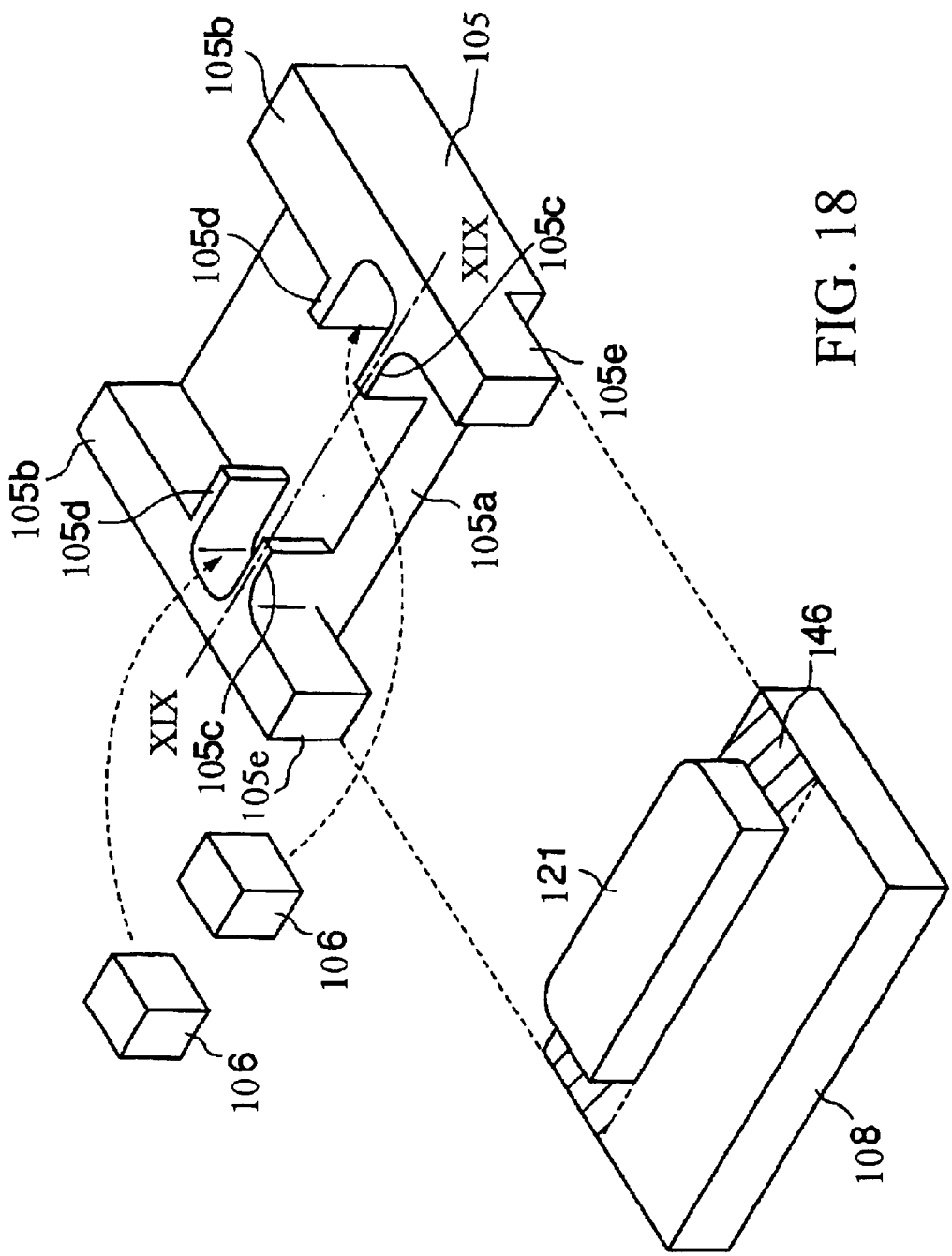
FIG. 18 is an exploded, perspective view of a base of the third embodiment of the semiconductor laser module according to the present invention.

As depicted in FIGS. 16 and 17, the semiconductor laser diode module of the third embodiment has a laser diode 101, and a discrete lens 114 optically coupled to the laser diode 101. The discrete lens 114 and the laser diode 101 are mounted on a base 102. The base 102 has a laser diode mounting member 108 as a laser diode mounting section, and a holder mounting member 105 for mounting the discrete lens 114. The base 102, the laser diode 101 and the discrete lens 114 are contained within a package 127. The base 102 is directly fixed to a bottom plate 126 of the package 127, and a laser diode mounting member 108 is arranged in contact with the package bottom plate 126.

A laser diode bonding portion 121 is provided on an upper side of the laser diode mounting member 108 to form a laser diode mounting region. The laser diode 101 is fixed to the laser diode bonding portion 121 via a heat sink 122. In addition, a thermistor 129 is preferably fixed to a fixing section 148 provided on the laser diode bonding portion 121. On the rear side of the laser diode bonding portion 121 of the laser diode mounting member 108, a photodiode 109 for monitoring the output of the laser diode 101, which is attached by chip carrier, is arranged in a position 147 shown by hatching in FIG. 16.

In the third embodiment, the laser diode mounting member 108 is preferably formed of CuW20 (a weight ratio is Cu 20% and W 80%), which is a Cu—W alloy having a high thermal conductivity preferably of 150 W/mK or more. Therefore, in the third embodiment, heat generated by the laser diode 101 can be efficiently transferred to the bottom plate 126.

Figure 19:
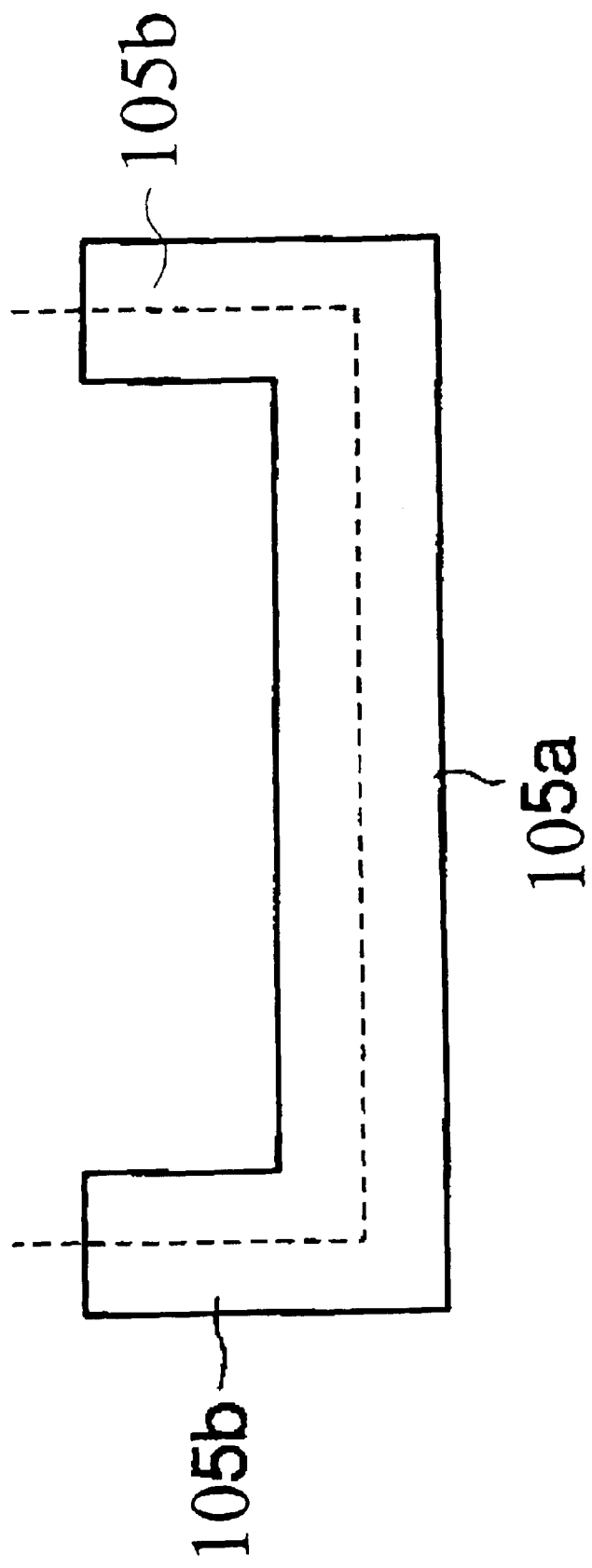
FIG. 19 is a cross-sectional view of a holder mounting member of the third embodiment of the semiconductor laser diode module according to the present invention taken along line XIX—XIX in FIG. 18.

The holder mounting member 105 is arranged on a front side of the laser diode bonding portion 121 of the laser diode mounting member 108. The holder mounting member 105 is fixed to the laser diode mounting member 108 by a brazing section 146 shown by hatching in FIG. 18. The holder mounting member 105 is substantially U-shaped along a cross-sectional view perpendicular to an optical axis of the laser diode 101 by vertically forming wall sections 105b, as depicted in FIG. 19. The wall sections 105b extend in the direction of the optical axis (the optical axis direction of the laser diode 101) on both sides of a base section 105a. Additionally, arm sections 105e are protrudingly formed by the rear end part of the side wall section 105b to the rear side in the direction of the optical axis in the holder mounting member 105, which increases a contacting area of the brazing section 146 and, at the same time, prevents warp of the base 102. A cross-sectional shape of a connection configuration between the arm sections 105e and the laser diode mounting member 108 also is substantially U-shaped along a cross section taken perpendicular to the optical axis of the laser diode 101. The above configuration provides a deflection preventing means in which the base is substantially U-shaped in a cross section perpendicular to the optical axis of the laser diode so as to enclose at least the part where the laser diode and the discrete lens are optically coupled. Therefore, the above-mentioned deflection preventing means can more surely, with a simple configuration, prevent or restrain a decrease in the efficiency of the optically coupling between the laser diode and the discrete lens due to deflection of the base.

In addition, protruding wall sections 105c and 105d are protrudingly formed in the direction perpendicular to the optical axis direction of the laser diode 101 from the side wall section 105b in the holder mounting member 105, and are configured such that fastening members 106 are inserted between them.

As described above, the base 102 is substantially U-shaped in a cross-sectional view taken perpendicular to the optical axis of the laser diode 101 so as to enclose at least a portion of the laser diode module where the laser diode 101 and the discrete lens 114 are optically coupled. Such a base configuration having a substantially U-shaped cross section is very strong against deflection, and forms deflection preventing means for preventing deflection of the base 102 at the part where at least the laser diode 101 and the discrete lens 114 are optically coupled.

As shown in FIG. 16, the discrete lens 114 includes a lens holder 124. The lens holder 124 is fixed to the holder mounting member 105 of the base 102 via fastening members or fastening means 106. The lens holder 124 and the fastening members 106 preferably have thermal expansion coefficient close to that of a glass material forming the discrete lens 114, and are preferably formed by Kovar®, which is an Fe—Ni—Co alloy having satisfactory laser-welding properties. The fastening members 106 can be configured in shapes as described in the first and second embodiments of the present invention (see FIGS. 6(a), 6(b), 6(c), and 6(d)).

A first joint position or laser-welded section 110 is preferably formed by laser-welding the holder mounting member 105 of the base 102 and the fastening member 106, and a second joint position or laser-welded section 111 is preferably formed by laser-welding the fastening member 106 and the lens holder 114. The first joint position 110 and the second joint position 112 are preferably formed at substantially a same height in a direction perpendicular to the base plate 126 of the package 127.

In addition to the discrete lens 114, the optical system of the third embodiment includes an optical isolator 130, a second lens 153, and an optical fiber 157. The optical isolator 130 is provided on the holder mounting member 105. The optical isolator is configured to allow light that passed through the discrete lens 114 to pass and configured to block light returning to the laser diode 101 side. A third joint position or laser-welded section 112 is preferably formed by laser-welding the optical isolator 130 and the holder mounting member 105. The third joint position 112 is preferably formed at substantially the same height as the first and the second joint positions 110 and 111 in the direction perpendicular to the base plate 126 of the package 127.

Figure 20:
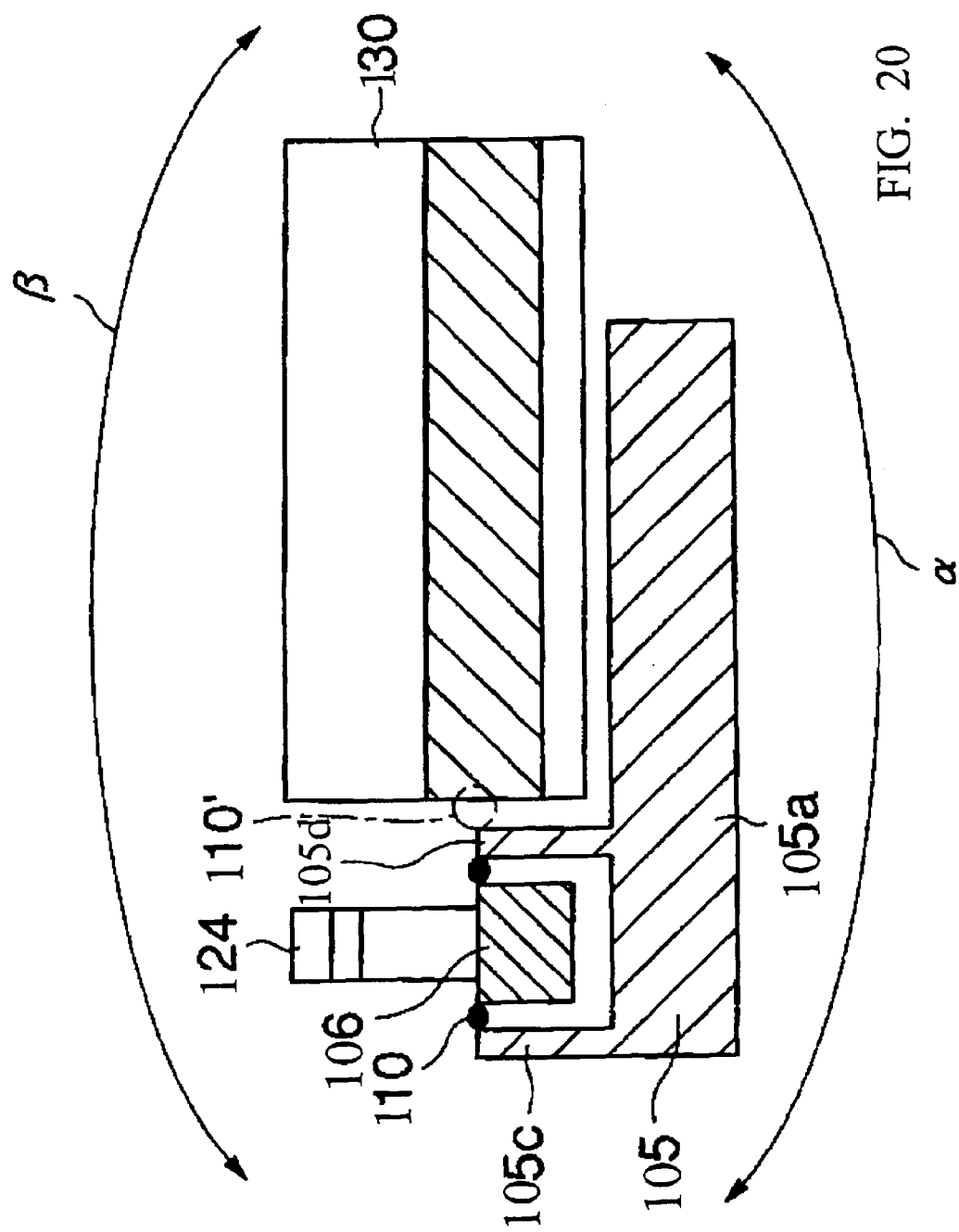
FIG. 20 is a cross-sectional view of the internal components of the third embodiment of the semiconductor laser diode module according to the present invention taken along line XX—XX in FIG. 16.

FIG. 20 shows the positional relationship among the holder mounting member 105, the fastening members 106, and the optical isolator 130 along line XX—XX in FIG. 16. As shown in FIG. 20, even if the base 2 tends to warp in a α direction (a direction in which both ends in the optical axis direction displace upward), the warp of the holder mounting member 105 in the α direction is restrained because the protruding wall section 105d exists between the fastening member 106 and the optical isolator 130. Additionally, even if the module tends to warp in a β direction (a direction in which both ends in the optical axis direction displace downward), the warp in the β direction is restrained because the fastening member 106 is fixed to the protruding wall sections 105c and 105d by laser-welding in the optical axis direction, and the optical isolator 130 is fixed to the wall section 105b.

In particular, since the fastening member 106 and the protruding wall sections 105c and 105d are laser-welded on surfaces opposing each other that are formed in the direction perpendicular to the optical axis direction, only tensile stress or compressive stress is applied and shearing stress is not applied against the warp in the α and the β directions. Therefore, subsidiary fracture of a laser-welded point can be more effectively prevented. From this point of view, the optical isolator 130 and the protruding wall section 105d can be configured such that they are joined, for example by laser-welding, at a point designated by the reference numeral 110'.

In addition, the height of an upper surface 145 of the wall section 105b in the holder mounting member 105 substantially coincides with the optical axis of the laser diode 101. Therefore, the height of the first, the second and the third joint positions 110, 111 and 112 substantially coincide with that of the optical axis of the laser diode 101. Thus, since the optical axis of the discrete lens 114 and the optical isolator 130 are positioned at this height, positional dislocation due to warping of the package and the base 102 can be restrained.

The holder mounting member 105 is made of a material having beneficial laser-welding characteristics, for example, the holder mounting member 105 preferably has a thermal conductivity of 50 W/mK or less thereby providing beneficial laser-welding characteristics for the holder mounting member 105 and the fastening members 106. In addition, the holder mounting member 105 is made of a material having deflection preventing properties, for example, the holder mounting member 105 is made of a material preferably having a Young's modulus of $15 \times 10^3$ kg/mm$^2$ or more in order to prevent deflection. Moreover, the holder mounting member 105 is preferably made of a material having weak magnetism (preferably without magnetism) so as not to damage the magnetism of the optical isolator 130 that is mounted thereon. For example, the holder mounting member 105 can be formed of SUS 430, since SUS 430 has a thermal conductivity of 26.4 W/mK, a Young's modulus of $20.4 \times 10^3$ kg/mm$^2$, and magnetism that is weak. Accordingly, since SUS 430 has low thermal conductivity, favorable laser-welding property is realized, and since SUS 430 has a high Young's modulus, a deflection preventive effect can be realized. Moreover, since SUS 430 has weak magnetism, magnetism of the optical isolator 130 is not damaged. Thus, an excellent semiconductor module having both favorable productivity and long term reliability can be realized.

As shown in FIG. 17, a through hole 151 is formed in the side wall of the package 127, and a light transmitting plate 152 for sealing the package is fixed to this through hole 151. In addition, a holder 154 to which a second lens 153 is fixed is inserted to be fixed to the through hole 151, and a ferule holder 155 is fixed to the one end side (right side of the figure) of this holder 154. A ferule 156 is fixed to the ferule holder 155, and an optical fiber (single mode optical fiber) 157 is inserted to be fixed to the ferule 156. In the third embodiment, a laser beam emitted from the laser diode 101 is optically coupled to the discrete lens 114 and incident on the optical isolator 130 through the discrete lens 114. Then, the light transmitted through the optical isolator 130 is collected on the incident side of the optical fiber 157 by the second lens 153, and is transmitted for a desired application through the optical fiber 157.

According to the third embodiment, since the base 102 mounting the laser diode 101 and the discrete lens 114 is formed by the laser diode mounting member 108 and the holder mounting member 105, and since the holder mounting member 105 is substantially U-shaped in the cross section perpendicular to the optical axis of the laser diode 101 and is to be fixed on the laser diode mounting member 108, then the holder mounting member 105 forms means for preventing deflection of the base 102, and deflection of the base 102 can be restrained by the deflection preventing means.

According to the third embodiment, since the upper surface 145 of the holder mounting member 105 is made to substantially coincide with the height of the optical axis of the laser diode 101, a decrease in the efficiency of optically coupling the laser diode 101 and the discrete lens 114 due to deflection of the base 102 can be surely restrained, and a semiconductor laser diode module with high long term reliability can be realized. In addition, since the first joint position 110 and the second joint position 111 are formed at substantially the same height (on the identical surface), then optical axis dislocation of the discrete lens 114 due to deflection of the base 102 is prevented. Moreover, since the optical isolator 130 is arranged on the holder mounting member 105 of the base 102, and the height of the third joint position 112 is made substantially the same as that of the first and the second joint positions, then dislocation of the optical isolator 130 as a result of deflection of the base 102 can be also restrained.

Thus, according to the third embodiment, a decrease in the efficiency of optically coupling the laser diode 101 and the discrete lens 114 can be more surely restrained, and a semiconductor laser diode module with higher long term reliability can be realized.

Figure 21:
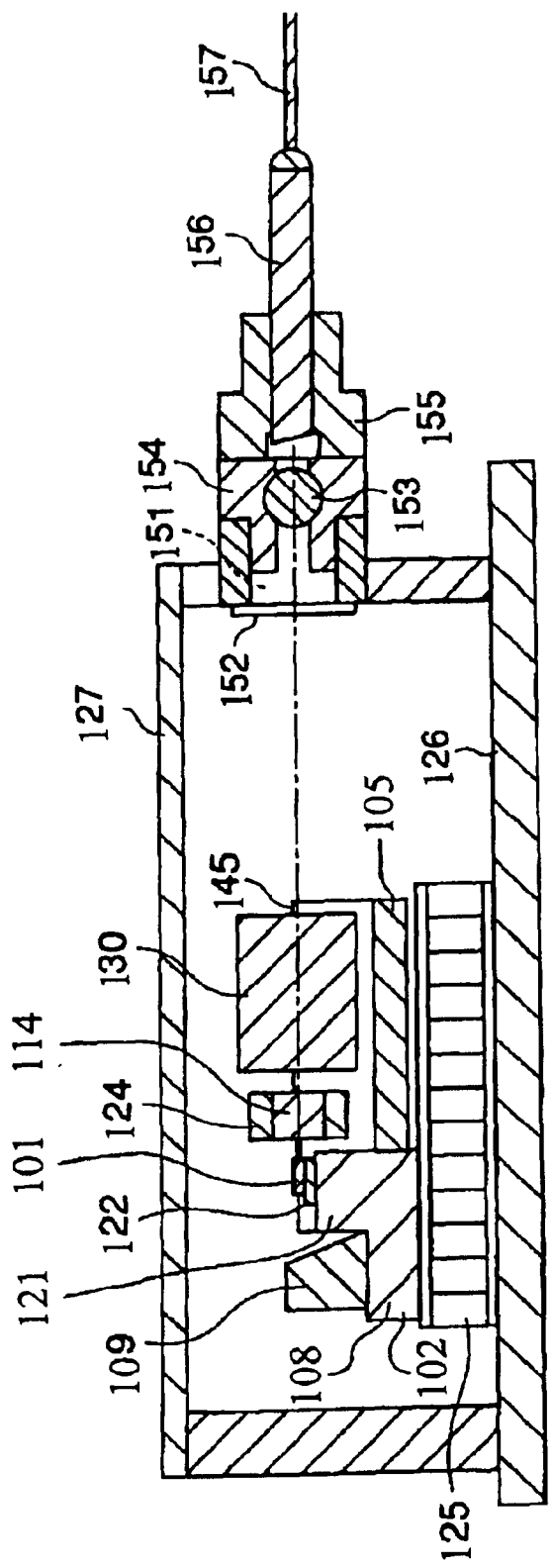
FIG. 21 is a cross-sectional view of a semiconductor laser diode module according to a fourth embodiment of the present invention.

The present invention is not limited to the above-mentioned embodiment, and various alternative embodiments may be adopted. For example, whereas in the third embodiment the base 102 is directly fixed on the bottom plate 126 of the package 127, a fourth embodiment can be provided with a thermo-module 125 on the bottom plate 126 of the package 127 for fixing the base 102 thereon, as depicted in FIG. 21. Accordingly, the temperature of the laser diode can be appropriately controlled by the thermo-module.

Moreover, whereas the base 102 in the third embodiment is configured to have both a holder mounting member 105 and a laser diode mounting member 108, the base 102 may be formed by as a unitary member having a holder mounting member for mounting the discrete lens 114.

Moreover, whereas the laser diode module of the third embodiment is formed by fixing an optical isolator 130 on the holder mounting member 105, the optical isolator 130 can be fixed to the package by a structure other than the holder mounting member 105, or the laser diode module may be formed without an optical isolator.

Moreover, whereas the discrete lens 114 of the third embodiment is used as a collimate lens, alternatively it may be used as a condenser lens to couple light to the optical fiber 157 without using the second lens 153.

It should be noted that the exemplary embodiments depicted and described herein set forth the preferred embodiments of the present invention, and are not meant to limit the scope of the claims hereto in any way. The various embodiments of the present invention provide numerous advantageous configurations, some of which are described below.

According to a first aspect of the present invention, since the base is formed by the laser diode mounting member contacted and disposed on the thermo module and by the holder mounting member on the upper side thereof, with the laser diode mounting member being formed of material having a thermal expansion coefficient in a range between a thermal expansion coefficient of the holder mounting member and a thermal expansion coefficient of the base side plate member of the thermo module, the present invention advantageously suppresses the warping of the base caused by the temperature change in the environmental circumstances of the semiconductor laser diode module in comparison with the related art module. Accordingly, the present invention advantageously suppresses the degradation in optical coupling efficiency between the laser diode and the optical fiber due to the temperature change of the environmental circumstances of the semiconductor laser diode module.

According to a second aspect of the invention, since the base is formed by the laser diode mounting member contacted and disposed on the thermo module and by the holder mounting member, with the thermal expansion coefficients of the laser diode mounting member and the bottom plate of the package being substantially equal to each other, the same magnitude of stress is applied on both upper and lower sides of the thermo module when the temperature change of the semiconductor laser diode module is generated. Therefore, the present invention advantageously offsets the warping of the thermo module and suppresses the degradation in optical coupling efficiency between the laser diode and the optical fiber due to the ambient temperature change.

According to a third aspect of the invention, since a first joint position obtained by laser-welding together the holder mounting member and the fastening members of the sleeve for holding the optical fiber and a second joint position obtained by laser-welding together the fastening members and the sleeve are formed to be at substantially the same height level in a direction perpendicular to a bottom plate of the package, even if warping is generated in the base to some extent, there is no significant positional displacement of the sleeve corresponding to the warping. Accordingly, the present invention advantageously suppresses the degradation in optical coupling efficiency between the laser diode and the optical fiber.

According to a fourth aspect of the invention, since a structural support member for preventing the warping of the base is provided on the base in a longitudinal direction of the optical fiber on at least one side of the optical fiber, the warping of the base is suppressed by the structural support members. Accordingly, the present invention advantageously suppresses the degradation in optical coupling efficiency between the laser diode and the optical fiber.

According to a fifth aspect of the invention, since a structural support member is provided on at least one side of an axial portion connecting a laser beam emitting facet of the laser diode and a laser beam receiving end of the optical fiber, warping at the axial portion is suppressed and the degradation in optical coupling efficiency between the laser diode and the optical fiber is efficiently suppressed. Accordingly, the present invention advantageously suppresses the degradation in optical coupling efficiency between the laser diode and the optical fiber.

According to a sixth aspect of the invention, since a structural support member is provided on at least one side of the fastening member located on the closest side to the laser diode (i.e., in a region along the longitudinal direction of the optical fiber of the holder mounting member including at least one side), warping of the base in the region of the fastening member that is most likely to affect the degradation in optical coupling efficiency between the laser diode and the optical fiber is suppressed.

According to a seventh aspect of the invention, since a structural support member is formed integrally with the holder mounting member, it is possible to avoid a reduction in mechanical strength due to the connection between a structural support member and a discrete holder mounting member. Thus, it is possible to effectively prevent the warping of the base by the structural support members, and to effectively suppress the degradation in optical coupling efficiency between the laser diode and the optical fiber.

According to an eighth aspect of the invention, since the structural support member is preferably formed with a wall portion extending in a longitudinal direction of the optical fiber, and provided upright at least on an upper side of the holder mounting member, it is possible to provide means for effectively suppressing the warping of the base with a simple structure. Accordingly, the present invention advantageously suppresses the degradation in optical coupling efficiency between the laser diode and the optical fiber.

According to a ninth aspect of the invention, since the fastening member for supporting and fastening the optical fiber in the closest side to the laser diode is formed of an integral part provided with a clamping portion for clamping both sides of the optical fiber, it is possible to suppress the warping of the base in the horizontal direction intersecting with the longitudinal direction of the optical fiber in comparison with a case where separate fastening members support each side of the optical fiber. Accordingly, the present invention advantageously suppresses the degradation in optical coupling efficiency between the laser diode and the optical fiber.

According to a tenth aspect of the invention, since the base is provided to project in the longitudinal direction of the optical fiber from end portion of the thermo module on the optical fiber mounting side, it is possible to suppress the phenomenon that the portion that is out of contact with the thermo module (i.e., the projection portion of the base) is subjected to the adverse effect of the warping of the thermo module. Thus, a fastening member of the optical fiber is mounted in this region to thereby make it possible to effectively suppress the degradation in optical coupling efficiency between the laser diode and the optical fiber.

According to an eleventh aspect of the invention, since the holder mounting member of the base is provided to project in the longitudinal direction of the optical fiber from the end portion of the laser diode mounting member on the optical fiber mounting side, it is possible to suppress the phenomenon that this portion is subjected to the adverse effect of the warping of the laser diode mounting member. Thus, a fastening member of the optical fiber is mounted in this projected region to thereby make it possible to effectively suppress the degradation in optical coupling efficiency between the laser diode and the optical fiber.

According to a twelfth aspect of the invention, since the laser diode mounting member of the base has a reinforcement portion formed under the fastening member located in the closest position to the laser diode, even if the vibration in the direction perpendicular to the package bottom plate is applied to the holder mounting member, any pivoting caused by the vibration will be farther from the laser diode than the fastening member. Additionally, the lower surface of the reinforcement portion is out of contact with the thermo module whereby it is possible to suppress the adverse effect of the warping of the thermo module against the reinforcement portion.

According to a thirteenth aspect of the invention, since the holder mounting member, the fastening members and the structural support members are preferably made of Kovar® or a similar material, it is possible to manufacture a semiconductor laser diode module with high workability/weldability. Additionally, Kovar® advantageously has substantially the same thermal expansion coefficient as that of the optical fiber, and thus adverse effects on the optical fiber due to the difference in thermal expansion coefficient between the optical fiber, and the holder mounting member and the structural support member are suppressed.

Numerous modifications and variations of the present invention are possible in light of the above teachings. It is therefore to be understood that, within the scope of the appended claims, the invention may be practiced otherwise than as specifically described herein.

What is claimed is:

1. A laser diode module comprising:
   a laser diode;
   an optical system including an optical fiber and a lens portion, said optical system being configured to receive and transmit a beam emitted from said laser diode through said lens portion to said optical fiber along an optical axis;
   a base configured to support said laser diode and at least a portion of said optical system; and
   a bottom plate configured to support said laser diode, said optical system, and said bases,
   wherein said base includes a solid structural support member configured to prevent warping of said base, said structural support member being elongated along said base in a direction generally parallel to said optical axis, and
   wherein said base comprises a laser diode mounting member and a holder mounting member mounted to said laser diode mounting member, said laser diode mounting member supporting said laser diode and said holder mounting member supporting a portion of said optical system, said holder mounting member being made of a material having a thermal conductivity value lower than a thermal conductivity value of said laser diode mounting member.

2. The laser diode module according to claim 1, wherein said base includes a plurality of structural support members extending along said base in a direction generally parallel to said optical axis.

3. The laser diode module according to claim 1, wherein said structural support member extends along said base on a first side of said optical fiber, and wherein said base further including an additional structural support member extending along said base in a direction generally parallel to said optical axis, said additional structural support member extending along said base on a second side of said optical fiber, said second side being opposite to said first side.

4. The laser diode module according to claim 1,
   wherein said optical fiber has a portion contained within a holder, and
   wherein said holder mounting member supports said holder.

5. The laser diode module according to claim 1, wherein said lens portion is a discrete lens supported by said holder mounting member.

6. The laser diode module according to claim 5, wherein:
   said optical system further comprises an optical isolator supported by said holder mounting member; and
   said optical system is configured to receive and transmit the beam emitted from said laser diode through said discrete lens and said optical isolator to said optical fiber along said optical axis.

7. The laser diode module according to claim 6, wherein:
   said discrete lens is fixed to a holder, and
   wherein said holder mounting member supports said holder.

8. The laser diode module according to claim 7, wherein said base further comprises a fastening member, said holder being coupled to said holder mounting member by said fastening member.

9. The laser diode module according to claim 5, wherein said optical fiber is supported by said bottom plate.

10. The laser diode module according to claim 9, wherein:
    said optical system further comprises a second lens supported by said bottom plate; and
    said optical system is configured to receive and transmit the beam emitted from said laser diode through said discrete lens and said second lens to said optical fiber along said optical axis.

11. The laser diode module according to claim 10, further comprising a package including said bottom plate, said package being configured to support said second lens and said optical fiber.

12. The laser diode module according to claim 5, wherein said laser diode mounting member is directly fixed on said bottom plate.

13. The laser diode module according to claim 5, wherein said laser diode mounting member is fixed on said bottom plate via a thermo module.

14. The laser diode module according to claim 1, wherein said structural support member extends along said holder mounting member.

15. The laser diode module according to claim 1, wherein said structural support member extends along said laser diode mounting member.

16. The laser diode module according to claim 1, wherein said laser diode mounting member has a U-shaped cross-sectional area taken along a plane transverse to said optical axis.

17. The laser diode module according to claim 1, wherein said holder mounting member has a U-shaped cross-sectional area taken along a plane transverse to said optical axis.

18. The laser diode module according to claim 1, wherein said laser diode mounting member and said holder mounting member are arranged to form together a U-shaped cross-sectional area taken along a plane transverse to said optical axis, around said laser diode.

19. The laser diode module according to claim 1, further comprising a fastening member, a portion of said optical system being contained within a holder, said holder being coupled to said holder mounting member by said fastening member.

20. The laser diode module according to claim 19, wherein said structural support member extends along said fastening member.

21. The laser diode module according to claim 19, wherein said fastening member has a U-shaped cross-sectional area taken along a plane transverse to said optical axis.

22. The laser diode module according to claim 21, wherein said U-shaped fastening member has terminal end portions that each are welded to said holder at a single point.

23. The laser diode module according to claim 19, wherein said fastening member is coupled to said holder at a location adjacent said lens portion.

24. The laser diode module according to claim 19, wherein said fastening member is received with a recessed portion on said holder mounting member.

25. The laser diode module according to claim 1, further comprising a plurality of fastening members,
wherein a portion of said optical system is contained within a holder,
wherein said holder is coupled to said holder mounting member by said plurality of fastening members, and
wherein said plurality of fastening members are received within recessed portions on said holder mounting member.

26. The laser diode module according to claim 1, further comprising a peltier device coupling said laser diode mounting member to said bottom plate.

27. The laser diode module according to claim 1, wherein said laser diode mounting member has a reinforcement portion configured to mechanically reinforce said holder mounting member located in a closest position to said laser diode.

28. The laser diode module according to claim 1, wherein said lens portion has a fiber lens formed on said optical fiber, and wherein said fiber lens has a tip end side that is arranged to be opposite a light emitting facet of said laser diode.

29. The laser diode module according to claim 28, wherein said fiber lens is an anamorphic lens.

30. The laser diode module according to claim 1, wherein said structural support member extends along said holder mounting member, said structural support member having a lower surface affixed to an upper surface of said laser diode mounting member, said structural support member having a portion that extends to a position alongside said laser diode.

31. A semiconductor laser diode module comprising:
a laser diode;
an optical system including an optical fiber and a lens portion, said optical system being configured to receive and transmit a beam emitted from said laser diode through said lens portion to said optical fiber along an optical axis;
a fastening means for supporting at least a portion of said optical system;
a base configured to support said fastening means and said laser diode; and
a bottom plate configured to support said laser diode, said optical system, said fastening means, and said base,
wherein a warping preventing means for preventing warping of said base is provided on said base, said warning preventing means being solid and being elongated in a direction generally parallel to said optical axis on at least one side of said optical system,
wherein said base has a fastening means mounting member on which said fastening means is mounted and a laser diode mounting member on which said laser diode is mounted, said fastening means mounting member being made of a material having a thermal conductivity value lower than a thermal conductivity value of said laser diode mounting member.

32. The semiconductor laser diode module according to claim 31, further comprising a thermo module coupling said laser diode mounting member to said bottom plate.

33. The semiconductor laser diode module according to claim 32, wherein said thermo module has a base side plate member attached to said laser diode mounting member, a bottom plate side plate member attached to said bottom plate, and a peltier element positioned between said base side plate member and said bottom plate side plate member.

34. The semiconductor laser diode module according to claim 32, wherein said base projects in a direction parallel to said optical axis from an end portion on an optical fiber mounting side of said thermo module.

35. The semiconductor laser diode module according to claim 32, wherein said laser diode mounting member disposed on said thermo module and configured to mount said laser diode at a laser diode mounting region,
wherein said fastening means mounting member is configured to mount said fastening means at a position other than said laser diode mounting region, and wherein said fastening means mounting member projects in a direction parallel to said optical axis from an end portion on an optical fiber mounting side of said laser diode mounting member.

36. The semiconductor laser diode module according to claim 35, wherein said laser diode mounting member has a reinforcement portion configured to mechanically reinforce one of a plurality of said fastening means located closest to said laser diode, and wherein a lower surface of said reinforcement portion is out of contact with said thermo module.

37. The semiconductor laser diode module according to claim 31, wherein said warping preventing means is provided on at least one side of said optical axis that connects a laser beam emitting facet of said laser diode and a laser beam receiving end of said optical fiber.

38. The semiconductor laser diode module according to claim 31, wherein a plurality of fastening means are provided to support said optical fiber at positions which are separated by a mutual interval in a direction of said optical axis.

39. The semiconductor laser diode module according to claim 38, wherein one of said plurality of fastening means which is located closest to said laser diode is formed of an integral part provided with a clamping portion configured to contact said optical fiber on two sides thereof.

40. The semiconductor laser diode module according to claim 31, wherein said warping preventing means is provided on said fastening means at a location on said fastening means closest to said laser diode.

41. The semiconductor laser diode module according to claim 31, wherein said warping preventing means and said fastening means mounting member are formed of an integral member.

42. The semiconductor laser diode module according to claim 41, wherein said warping preventing means is formed as a wall portion extending in a direction parallel to said optical axis, said wall portion being provided upright on at least an upper side of said fastening means mounting member.

43. The semiconductor laser diode module according to claim 41, wherein said fastening means mounting member is formed of an Fe—Ni—Co alloy.

44. The semiconductor laser diode module according to claim 31, wherein said fastening means is formed of an Fe—Ni—Co alloy.

45. The semiconductor laser diode module according to claim 31, wherein said warping-preventing means is formed of an Fe—Ni—Co alloy.

46. The semiconductor laser diode module according to claim 31, further comprising a package including said bottom plate, said package being configured to accommodate therein said laser diode, said optical system, said fastening means, and said base.

47. The semiconductor laser diode module according to claim 31, wherein said lens portion has a fiber lens formed on said optical fiber, and wherein a tip end side of said fibrous lens and a light emitting facet of said laser diode are arranged to oppose each other.

48. The semiconductor laser diode module according to claim 47, wherein said fiber lens is an anamorphic lens.

49. The semiconductor laser diode module according to claim 31, wherein said lens portion is a discrete lens supported by said fastening means mounting member.

50. The semiconductor laser diode module according to claim 49, wherein:

said optical system further comprises an optical isolator supported by said fastening means mounting member; and said optical system is configured to receive and transmit the beam emitted from said laser diode through said discrete lens and said optical isolator to said optical fiber along said optical axis.

51. The semiconductor laser diode module according to claim 50, wherein:

said discrete lens is fixed to a holder; and said fastening means mounting member supports said holder.

52. The semiconductor laser diode module according to claim 51, wherein said holder is coupled to said fastening means mounting member by said fastening means.

53. The semiconductor laser diode module according to claim 49, wherein said optical fiber is supported by said bottom plate.

54. The semiconductor laser diode module according to claim 53, wherein:

said optical system further comprises a second lens supported by said bottom plate; and said optical system is configured to receive and transmit the beam emitted from said laser diode through said discrete lens, said optical isolator, and said second lens to said optical fiber along said optical axis.

55. The semiconductor laser diode module according to claim 54, further comprising a package including said bottom plate, said package being configured to support said second lens and said optical fiber.

56. The semiconductor laser diode module according to claim 49, wherein said laser diode mounting member is directly fixed on said bottom plate.

57. The semiconductor laser diode module according to claim 49, wherein said laser diode mounting member is fixed on said bottom plate via a thermo module.

* * * * *